(12) United States Patent
Doi et al.

(10) Patent No.: US 11,777,585 B2
(45) Date of Patent: Oct. 3, 2023

(54) WIRELESS RECEIVING APPARATUS AND METHOD THEREOF

(71) Applicants: NEC CORPORATION, Tokyo (JP); OSAKA UNIVERSITY, Suita (JP); THE DOSHISHA, Kyoto (JP)

(72) Inventors: Takanobu Doi, Tokyo (JP); Kazushi Muraoka, Tokyo (JP); Naoto Ishii, Tokyo (JP); Takumi Takahashi, Osaka (JP); Shinsuke Ibi, Kyoto (JP)

(73) Assignees: NEC CORPORATION, Tokyo (JP); OSAKA UNIVERSITY, Suita (JP); THE DOSHISHA, Kyoto (JP)

( * ) Notice: Subject to any disclaimer, the term of this patent is extended or adjusted under 35 U.S.C. 154(b) by 0 days.

(21) Appl. No.: 17/899,086

(22) Filed: Aug. 30, 2022

(65) Prior Publication Data
US 2023/0075680 A1 Mar. 9, 2023

(30) Foreign Application Priority Data
Sep. 3, 2021 (JP) .................................. 2021-144215

(51) Int. Cl.
*H04B 7/08* (2006.01)
(52) U.S. Cl.
CPC .................................... *H04B 7/086* (2013.01)
(58) Field of Classification Search
CPC .... H04B 7/086; H04B 7/0854; H04B 7/0857; H04B 7/0862; H04B 7/0865; H04B 7/0848
See application file for complete search history.

(56) References Cited

U.S. PATENT DOCUMENTS

| 7,194,237 B2* | 3/2007 | Sugar ................... H04B 7/0615 455/39 |
| 7,583,763 B2* | 9/2009 | Nissani (Nissensohn) ................. H04L 25/03242 375/316 |

(Continued)

OTHER PUBLICATIONS

Pritam Som et al., "Improved Large-MIMO Detection Based on Damped Belief Propagation," 2010 IEEE Information Theory Workshop on Information Theory (ITW 2010, Cairo), 2010, pp. 1-5.

(Continued)

*Primary Examiner* — James M Perez
(74) *Attorney, Agent, or Firm* — Sughrue Mion, PLLC

(57) ABSTRACT

A wireless receiving apparatus generates an N'×B' weight matrix W whose columns are orthogonal to each other by decomposing an estimated N'×M' channel matrix into the N'×B' weight matrix W and a B'×M' matrix containing two or more non-zero matrix elements in each column, where B' is an integer less than or equal to N'-1 and greater than or equal to M'. Alternatively, the wireless receiving apparatus generates a combination of an N'×B' sub-weight matrix $W_1$ and at least one second sub-weight matrix, where the product of the sub-weight matrix $W_1$ with the at least one second sub-weight matrix is equal to the weight matrix W. The wireless receiving apparatus performs receive beamforming on received signals of N' receiving antennas using the weight matrix W or the sub-weight matrix $W_1$. The wireless receiving apparatus then performs a BP algorithm using receive-beamformed signals.

18 Claims, 18 Drawing Sheets

(56) References Cited

U.S. PATENT DOCUMENTS

| | | | |
|---|---|---|---|
| 7,616,695 B1* | 11/2009 | Sarrigeorgidis | H04L 25/0242 375/267 |
| 7,680,461 B2* | 3/2010 | Takano | H04B 7/0842 375/267 |
| 8,000,421 B2* | 8/2011 | Takano | H04B 7/0842 375/349 |
| 8,325,844 B2* | 12/2012 | Walton | H04B 7/0678 375/267 |
| 8,385,364 B2* | 2/2013 | Yang | H04L 5/0071 370/344 |
| 8,385,489 B2* | 2/2013 | Azadet | H04L 25/0232 375/348 |
| 8,411,806 B1* | 4/2013 | Lee | H04L 25/03891 375/349 |
| 8,451,944 B2* | 5/2013 | Gaur | H04B 7/0426 375/350 |
| 8,548,088 B2* | 10/2013 | Lee | H04L 25/03343 375/296 |
| 8,589,755 B2* | 11/2013 | Djordjevic | H03M 13/1117 714/755 |
| 8,665,977 B2* | 3/2014 | Cheng | H04L 25/03242 375/325 |
| 8,774,310 B2* | 7/2014 | Khan | H04L 25/03343 375/296 |
| 9,036,992 B2* | 5/2015 | Djordjevic | H04B 10/616 398/79 |
| 9,191,080 B2* | 11/2015 | Yokomakura | H04B 7/0413 |
| 9,531,465 B2* | 12/2016 | Wang | H04B 7/0617 |
| 9,917,682 B2* | 3/2018 | Zhang | H04B 7/0626 |
| 10,116,370 B2* | 10/2018 | Obara | H04W 88/02 |
| 10,211,906 B1* | 2/2019 | Nam | H04B 7/0478 |
| 10,516,452 B1* | 12/2019 | Pekoz | H04L 25/0204 |
| 10,897,299 B2* | 1/2021 | Muraoka | H04B 7/088 |
| 11,184,205 B2* | 11/2021 | Matsumura | H04B 17/345 |
| 11,196,468 B2* | 12/2021 | Shikida | H04B 7/0482 |
| 11,418,241 B2* | 8/2022 | Bengtsson | H04B 7/0456 |
| 11,595,153 B2* | 2/2023 | Muraoka | H04L 1/0045 |
| 2003/0185309 A1* | 10/2003 | Pautler | H04L 25/021 375/257 |
| 2003/0218973 A1* | 11/2003 | Oprea | H04B 7/0434 370/210 |
| 2004/0190636 A1* | 9/2004 | Oprea | H04B 7/0417 375/299 |
| 2004/0192218 A1* | 9/2004 | Oprea | H04L 25/03343 455/73 |
| 2005/0141631 A1* | 6/2005 | Takano | H04L 1/0656 375/267 |
| 2005/0249304 A1* | 11/2005 | Takano | H04B 7/0613 375/267 |
| 2006/0008024 A1* | 1/2006 | Wight | H04B 7/0848 375/267 |
| 2006/0071807 A1* | 4/2006 | Sadowsky | H04B 7/0636 340/13.24 |
| 2006/0239374 A1* | 10/2006 | Aldana | H04B 7/0634 375/267 |
| 2006/0245513 A1* | 11/2006 | Koo | H04B 7/0634 375/267 |
| 2006/0291544 A1* | 12/2006 | Fischer | H04B 7/0634 375/267 |
| 2007/0160011 A1* | 7/2007 | Kim | H04B 7/0417 370/332 |
| 2007/0189151 A1* | 8/2007 | Pan | H04L 1/04 370/204 |
| 2007/0226287 A1* | 9/2007 | Lin | H04B 7/0478 708/490 |
| 2008/0008270 A1* | 1/2008 | Li | H03M 13/2972 375/340 |
| 2008/0080449 A1* | 4/2008 | Huang | H04B 7/0634 370/342 |
| 2008/0108310 A1* | 5/2008 | Tong | H04L 5/0028 455/69 |
| 2008/0232501 A1* | 9/2008 | Khojastepour | H04B 7/0417 375/267 |
| 2009/0207078 A1* | 8/2009 | Fletcher | H04B 7/0617 342/368 |
| 2010/0153810 A1* | 6/2010 | Kamiya | H03M 13/1117 714/752 |
| 2011/0212743 A1* | 9/2011 | Yokomakura | H04L 25/0242 455/509 |
| 2014/0341144 A1* | 11/2014 | Zhang | H04B 7/0626 370/329 |
| 2015/0030166 A1* | 1/2015 | Ranieri | H04R 29/005 381/58 |
| 2015/0270882 A1* | 9/2015 | Shattil | H04B 7/024 370/329 |
| 2016/0248495 A1* | 8/2016 | Shikida | H04B 7/0413 |
| 2016/0290805 A1* | 10/2016 | Irish | G01C 21/005 |
| 2017/0126458 A1* | 5/2017 | Shattil | H04B 7/026 |
| 2017/0195939 A1* | 7/2017 | Tujkovic | H04B 7/0617 |
| 2017/0202005 A1* | 7/2017 | Madan | H04W 72/542 |
| 2018/0092110 A1* | 3/2018 | Mallik | H04L 5/0096 |
| 2018/0138957 A1* | 5/2018 | Wang | H04W 92/00 |
| 2018/0242160 A1* | 8/2018 | Morita | H04W 16/08 |
| 2018/0248592 A1* | 8/2018 | Ashrafi | H04L 5/0048 |
| 2018/0310244 A1* | 10/2018 | Wich | H04L 5/0048 |
| 2018/0324004 A1* | 11/2018 | Shikida | H04L 25/0224 |
| 2020/0052852 A1* | 2/2020 | Vitthaladevuni | H04B 7/0619 |
| 2020/0212971 A1* | 7/2020 | Shikida | H04B 7/0617 |
| 2020/0266863 A1* | 8/2020 | Muraoka | H04L 25/0224 |
| 2021/0126683 A1* | 4/2021 | Shikida | H04B 7/0478 |
| 2021/0203390 A1* | 7/2021 | Bengtsson | H04L 5/0048 |
| 2021/0328654 A1* | 10/2021 | Shikida | H04B 7/024 |
| 2022/0069876 A1* | 3/2022 | Xue | H04B 7/0617 |
| 2022/0337341 A1* | 10/2022 | Muraoka | H04L 1/0045 |
| 2022/0417876 A1* | 12/2022 | Ranson | H04W 56/001 |
| 2023/0033470 A1* | 2/2023 | Wehr | G06T 7/70 |
| 2023/0055302 A1* | 2/2023 | Wu | H04L 41/0806 |
| 2023/0075680 A1* | 3/2023 | Doi | H04B 7/086 |
| 2023/0116477 A1* | 4/2023 | Sengupta | H04L 5/0039 370/329 |
| 2023/0132338 A1* | 4/2023 | Stoica | H04B 7/0617 375/267 |
| 2023/0139174 A1* | 5/2023 | Paz | H04L 5/0073 370/329 |
| 2023/0155864 A1* | 5/2023 | Abdoli | H04L 25/0204 370/329 |

OTHER PUBLICATIONS

Takumi Takahashi et al., "Design of Criterion for Adaptively Scaled Belief in Iterative Large MIMO Detection," IEICE Transaction on Communications, Feb. 2019, pp. 285-297, vol. E102.B, No. 2.

Shogo Tanabe et al., "A Study on Low-Complexity Belief Propagation Detection Using Sorted-QR Decomposition for Large MIMO Systems", IEICE Technical Report RCS2016-15, Apr. 2016, pp. 83-88, vol. 116, No. 11.

* cited by examiner

|                | TOTAL NUMBER OF ITERATIONS | | |
|---|---|---|---|
|                | 3 | 8 | 16 |
| 1ST ITERATION  | $a_3^{(1)}, \eta_3^{(1)}$ | $a_8^{(1)}, \eta_8^{(1)}$ | $a_{16}^{(1)}, \eta_{16}^{(1)}$ |
| 2ND ITERATION  | $a_3^{(2)}, \eta_3^{(2)}$ | $a_8^{(2)}, \eta_8^{(2)}$ | $a_{16}^{(2)}, \eta_{16}^{(2)}$ |
| 3RD ITERATION  | $a_3^{(3)}, \eta_3^{(3)}$ | $a_8^{(3)}, \eta_8^{(3)}$ | $a_{16}^{(3)}, \eta_{16}^{(3)}$ |
| ⋮              |   | ⋮ | ⋮ |
| 8TH ITERATION  |   | $a_8^{(8)}, \eta_8^{(8)}$ | $a_{16}^{(8)}, \eta_{16}^{(8)}$ |
| ⋮              |   |   | ⋮ |
| 16TH ITERATION |   |   | $a_{16}^{(16)}, \eta_{16}^{(16)}$ |

Fig. 10

| | TOTAL NUMBER OF ITERATIONS | | |
|---|---|---|---|
| | 3 | 8 | 16 |
| 1ST ITERATION | $a_3^{(1)}, \{n_{3,i,t-k}^{(1)}\}$ | $a_8^{(1)}, \{n_{8,i,t-k}^{(1)}\}$ | $a_{16}^{(1)}, \{n_{16,i,t-k}^{(1)}\}$ |
| 2ND ITERATION | $a_3^{(2)}, \{n_{3,i,t-k}^{(2)}\}$ | $a_8^{(2)}, \{n_{8,i,t-k}^{(2)}\}$ | $a_{16}^{(2)}, \{n_{16,i,t-k}^{(2)}\}$ |
| 3RD ITERATION | $a_3^{(3)}, \{n_{3,i,t-k}^{(3)}\}$ | $a_8^{(3)}, \{n_{8,i,t-k}^{(3)}\}$ | $a_{16}^{(3)}, \{n_{16,i,t-k}^{(3)}\}$ |
| ... | | ... | ... |
| 8TH ITERATION | | $a_8^{(8)}, \{n_{8,i,t-k}^{(8)}\}$ | $a_{16}^{(8)}, \{n_{16,i,t-k}^{(8)}\}$ |
| ... | | | ... |
| 16TH ITERATION | | | $a_{16}^{(16)}, \{n_{16,i,t-k}^{(16)}\}$ |

WIRELESS RECEIVING APPARATUS AND METHOD THEREOF

INCORPORATION BY REFERENCE

This application is based upon and claims the benefit of priority from Japanese patent application No. 2021-144215, filed on Sep. 3, 2021, the disclosure of which is incorporated herein in its entirety by reference.

TECHNICAL FIELD

The present disclosure relates to a radio communication system, and in particular, to received signal processing.

BACKGROUND ART

Massive multi-user Multi-Input Multi-Output (MIMO) is known as a method to achieve high-capacity communication, in which a base station with many antennas is used for wireless communication with multiple users. Massive multi-user MIMO is also called massive MIMO. Massive multi-user MIMO can be used, for example, in the uplink of a multiple-access cellular system, such as a fifth-generation mobile communications (5G) system. The receiver of massive multi-user MIMO needs to perform multi-user detection to separate multi-user signals from received signals. A 5G base station is composed of one or more a Distributed Units (DUs) and a Central Unit (CU), which are mainly responsible for digital baseband signal processing, and one or more Radio Units (RUs), which are mainly responsible for Radio Frequency (RF) signal processing for transmitting and receiving radio signals. Typically, multi-user detection is performed at a DU. In this case, received signals received at the RU need to be transmitted to the DU via a fronthaul connecting between the RU and the DU. However, in massive multi-user MIMO, the number of received signals that need to be transmitted in the fronthaul is very large because the radio signals are received by a large number of antennas, requiring the fronthaul bandwidth between the RU and DU to be wideband.

One of the known multi-user detection algorithms is the Gaussian Belief Propagation (GaBP) algorithm (see, for example, Non-Patent Literature 1 and 2). The GaBP algorithm propagates quality values (called beliefs) representing the reliability of detected symbols between iteration processes, thereby gradually improving the detection accuracy. The GaBP algorithm is a low-computation detection algorithm because it uses a Gaussian approximation based on the central limit theorem assuming a large system. A detector using the GaBP algorithm includes a soft interference canceller (IC), a belief generator (BG), and a soft replica Generator (RG). The soft interference canceller cancels interference components from received signals using replicas of respective transmission symbols obtained in one previous iteration. The belief generator generates beliefs based on the post-cancellation signals. The soft replica generator generates replicas of transmitted signals based on the beliefs.

Techniques for improving the performance of soft decision detection or decoding that uses the GaBP algorithm include damping, scaling, and node selection. In the damping, a weighted average of the previous belief generated in the previous iteration and the current belief generated in the current iteration is used as a new belief, thereby stabilizing the fluctuations of beliefs that cause poor convergence (see Non-Patent Literature 1). A damping factor or coefficient defines a weight of the weighted average in the damping. The scaling takes into account that the reliability of beliefs in early iterations is relatively low, and accordingly adjusts the absolute values of the beliefs so that they become gradually larger as the number of iterations increases (see Non-Patent Literature 2). The scaling factor or coefficient is a parameter used to adjust the absolute values of the beliefs in the scaling. In the case of MIMO detection, the node selection is used as a countermeasure against fading spatial correlations (i.e., correlations among receiving antennas) (see Non-Patent Literature 2). Specifically, in the node selection, a set of receiving antenna elements is divided into a plurality of subsets. Each subset is composed of receiving antenna elements spatially separated from each other (i.e., having lower correlations). The GaBP algorithm that involves node selection updates only the beliefs of one subset in each GaBP iteration and sequentially updates the beliefs of the other subsets in the following GaBP iterations.

While the GaBP algorithm has excellent detection characteristics, it requires knowledge of all the received signals to detect each transmitted signal. Accordingly, a wide fronthaul bandwidth is required to transmit radio signals received by all the receiving antennas of the RU from the RU to the DU.

One of the other known multi-user detection algorithms is the QR-decomposed Gaussian Belief Propagation (QR-GA-BP) algorithm (see Non-Patent Literature 3). The QR-GA-BP decomposes an N'×M' (i.e., N' rows and M' columns) channel matrix, defined between M' transmit antennas of one or more wireless transmitting devices and N' receive antennas of wireless receiving devices, into an N'×M' matrix Q, whose columns are orthogonal to each other, and an M'-order upper triangular matrix by QR decomposition. In addition, the QR-GA-BP performs receive beamforming by taking the matrix product of the Hermitian conjugate of the generated matrix Q with the N'×1 received signal vector composed of the received signals of the N' receiving antennas. The QR-GA-BP then detects transmitted signals from the received signals after beamforming by applying the GaBP algorithm. The QR-GA-BP takes advantage of the fact that the channel matrix after receive beamforming is an upper triangular matrix, and generates beliefs sequentially from received signals with fewer included transmitted signal components. In the first step, a belief and a replica are generated using the GaBP algorithm for a received signal that contains only one transmitted signal component. In the subsequent m-th step, beliefs and replicas are generated by the GaBP algorithm using the (m−1) received signals used in the (m−1)th step, a received signal containing m transmitted signal components, and the beliefs and replicas generated in the (m−1)th step.

Due to the nature of the upper triangular matrix, the accuracy of the Gaussian approximation by the central limit theorem deteriorates when m is small because the m-th received signal contains only the first through m transmitted signal components. Thus, a method of generating beliefs for all received signals simultaneously cannot provide accurate beliefs. To solve this problem, the QR-GA-BP cancels the interference components of the m-th transmitted signal component using the first to (m−1)th transmitted signal components that are accurately generated by sequentially detecting from the first received signal, which does not contain any interference components. As a result, the interferences by the first through (m−1)th transmitted signal components are canceled with high accuracy, and the QR-GA-BP can generate beliefs and replicas of the m-th transmitted signal component with high accuracy. The QR-GA- BP performs the above steps for all received signals and gradually improves the detection accuracy by repeating the set of these steps.

NON-PATENT LITERATURE

Non-Patent Literature 1: P. Som, T. Datta, A. Chockalingam and B. S. Rajan, "Improved large-MIMO detection based on damped belief propagation," 2010 IEEE Information Theory Workshop on Information Theory (ITW 2010, Cairo), pp. 1-5, 2010

Non-Patent Literature 2: T. Takahashi, S. Ibi and S. Sampei, "Design of criterion for adaptively scaled belief in iterative large MIMO detection," IEICE Transaction on Communications, vol. E102.B, no. 2, pp. 285-297, 2019

Non-Patent Literature 3: S. Tanabe and K. Ishibashi, "A Study on Low-Complexity Belief Propagation Detection Using Sorted-QR Decomposition for Large MIMO Systems", IEICE Tech. Rep., vol. 116, no. 11, RCS2016-15, pp. 83-88, April 2016

SUMMARY

The QR-GA-BP performs multi-user detection after receive beamforming to reduce the number of received signals used for detection from the number of receiving antennas to the number of transmitted signals, while still providing high detection accuracy. This can reduce the number of signals transmitted from the RU to the DU, thus reducing the required fronthaul bandwidth. On the other hand, the QR-GA-BP requires a longer processing time than the normal GaBP. This is because interference cancellation and belief and replica generation need to be performed sequentially for each received signal, and thus interference cancellation, and these cannot be performed simultaneously for all received signals as in the aforementioned GaBP. Note that QR-GA-BP does not allow the usual GaBP to be applied in place of the method of sequentially generating beliefs for each received signal. The reason for this is that the equivalent channel matrix after receive beamforming is an upper triangular matrix, so the multiple received signals after receive beamforming each contain a different number of received signals (components). In other words, the multiple received signals differ in the number of transmitted signals (components) they encompass. This degrades the accuracy of the Gaussian approximation by the central limit theorem with respect to some received signals. Therefore, if GaBP is used to generate beliefs for all received signals simultaneously, the algorithm will not converge correctly because of the variation in accuracy among the generated multiple beliefs.

The GaBP algorithm requires a wideband fronthaul between the RU and the DU for massive multi-user MIMO using a large number of antennas. On the other hand, the QR-GA-BP has the problem of requiring long processing time for multiuser detection because it involves sequential processing.

Specifically, the GaBP algorithm can update beliefs for all the received signals simultaneously, thus enabling multiuser detection in a short processing time. However, the GaBP algorithm performs multiuser detection using a number of received signals equal to the number of receiving antennas, which increases the required bandwidth of the fronthaul. On the other hand, the QR-GA-BP algorithm can reduce the number of received signals used for multiuser detection to the number of transmitted signals, by performing receive beamforming with the Q matrix obtained by QR decomposition of the channel matrix. This reduces the required bandwidth for fronthaul, but requires a long processing time due to the sequential interference cancellation and belief and replica generation required for multiuser detection.

One of the objects to be attained by example embodiments disclosed herein is to provide an apparatus, a method, and a program that contribute to reducing the processing time required for multi-user detection at a DU while reducing the required bandwidth of the fronthaul between the DU and the RU. It should be noted that this object is merely one of the objects to be attained by the example embodiments disclosed herein. Other objects or problems and novel features will be made apparent from the following description and the accompanying drawings.

In a first aspect, a wireless receiving apparatus includes at least one beamforming weight generator, a first beamformer, and a BP detector. The at least one beamforming weight generator is configured to generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, where B' is an integer less than or equal to N'−1 and greater than or equal to M'. Alternatively, the at least one beamforming weight generator is configured to generate a combination of an N'×B' sub-weight matrix $W_1$ and at least one second sub-weight matrix, where a product of the sub-weight matrix $W_1$ with the at least one second sub-weight matrix is equal to the weight matrix W. The first beamformer is configured to perform receive beamforming on received signals of the N' receiving antennas using the weight matrix W or the sub-weight matrix $W_1$. The BP detector is configured to perform a BP algorithm using signals output from the first beamformer and transmitted through a fronthaul.

In a second aspect, a method performed by a wireless receiving apparatus includes the following steps:
(a) generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;
(b) performing first receive beamforming on received signals of the N' receiving antennas using the weight matrix W or the sub-weight matrix $W_1$; and
(c) performing a belief propagation (BP) algorithm using signals which the first receive beamforming has been performed for and transmitted via a fronthaul.

In a third aspect, an RU included in a wireless receiving apparatus and configured to be coupled via a fronthaul to a DU of the wireless receiving apparatus includes at least one beamforming weight generator and a first beamformer. The at least one beamforming weight generator is configured to generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, where B' is an integer less than or equal to N'−1 and greater than or equal to M'. Alternatively, the at least one beamforming weight generator is configured to generate a combination of an N'×B' sub-weight matrix $W_1$ and at least one second sub-weight matrix, where a product of the sub-weight matrix $W_1$ with the at least one second sub-weight matrix is equal to the weight matrix W. The first beamformer is configured to perform receive beamforming on received signals of the N' receiving antennas using the weight matrix W or the sub-weight matrix $W_1$ and provide beamformed signals to the DU via the fronthaul.

In a fourth aspect, a method performed by an RU included in a wireless receiving apparatus and coupled via a fronthaul to a DU of the wireless receiving apparatus includes the following steps:
(a) generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;
(b) performing receive beamforming on received signals of the N' receiving antennas using the weight matrix W or the sub-weight matrix $W_1$; and
(c) providing beamformed signals to the DU via the fronthaul.

In a fifth aspect, a DU included in a wireless receiving apparatus and configured to be coupled via a fronthaul to an RU of the wireless receiving apparatus includes at least one beamforming weight generator and a BP detector. The at least one beamforming weight generator is configured to generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, where B' is an integer less than or equal to N'−1 and greater than or equal to M'. Alternatively, the at least one beamforming weight generator is configured to generate a combination of an N'×B' sub-weight matrix $W_1$ and at least one second sub-weight matrix, where a product of the sub-weight matrix $W_1$ with the at least one second sub-weight matrix is equal to the weight matrix W. The BP detector is configured to perform a BP algorithm using signals, which has been generated and transmitted via the fronthaul by the RU by performing receive beamforming on received signals of the N' receiving antennas using the weight matrix W or the sub-weight matrix $W_1$.

In a sixth aspect, a method performed by a DU included in a wireless receiving apparatus and coupled via a fronthaul to an RU of the wireless receiving apparatus includes the following steps:
(a) generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;
(b) providing the weight matrix W or the sub-weight matrix $W_1$ to the RU; and
(c) performing a BP algorithm using signals, the signals being generated and transmitted via the fronthaul by the RU by performing receive beamforming on received signals of the N' receiving antennas using the weight matrix W or the sub-weight matrix $W_1$.

In a seventh aspect, a program includes instructions (software codes) that, when loaded into a computer, cause the computer to perform the method according to the above-described second, fourth, or sixth aspect.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 10 is a diagram showing an example of a lookup table according to the first example embodiment;

FIG. 11 is a diagram showing an example of a lookup table according to the first example embodiment;

EXAMPLE EMBODIMENT

Specific example embodiments will be described hereinafter in detail with reference to the drawings. The same or corresponding elements are denoted by the same symbols throughout the drawings, and duplicated explanations are omitted as necessary for the sake of clarity.

First Example Embodiment

Figure 1:
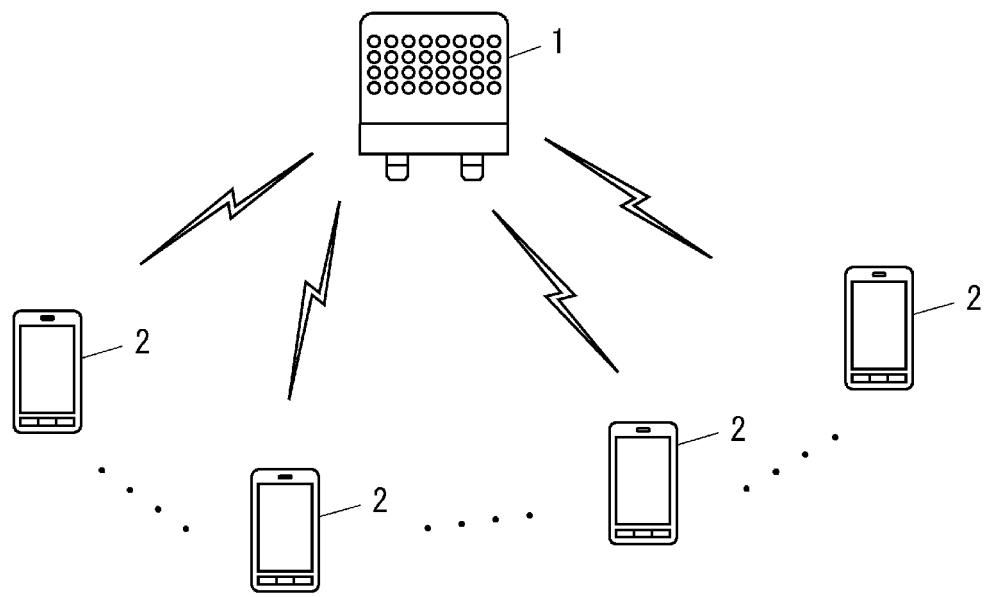
FIG. 1 is a diagram showing a radio communication system according to a first example embodiment.

FIG. 1 shows an example configuration of a radio communication system according to a plurality of example embodiments, including the present example embodiment. Referring to FIG. 1, a base station 1 provides wireless access to a plurality of radio terminals 2. The base station 1 may be referred to as an access point, transmission/reception point (TRP), or by any other name. The base station 1 may be a gNB in a 5G system, for example, and may be a system that includes at least one RU and at least one DU. The RU may perform RF signal processing and some physical layer or layer 1 (e.g., Low PHY) signal processing. The physical layer signal processing performed by the RU may include, for example, digital beamforming. The DU may perform the remaining physical layer (e.g., High PHY) processing and Layer 2 signal processing. The RU and the DU are connected via a fronthaul. The fronthaul is also referred to as a mobile fronthaul or (mobile) fronthaul network. For example, the fronthaul may be a wired fronthaul using one or more optical fibers or a wireless fronthaul using millimeter wave wireless transmission.

In some implementations, the radio communication system may utilize multi-user MIMO technology for uplink transmission from the plurality of wireless terminals 2 to the base station 1. In this case, the base station 1 may receive reference signals from the plurality of wireless terminals 2, estimate the MIMO channel between the plurality of wireless terminals 2 and the base station 1 using the received reference signals, and detect the transmitted signals using the data signals received from the plurality of wireless terminals 2 and the estimated channel. In other words, the base station 1 may perform MIMO detection to separate the multi-user signals of the plurality of radio terminals 2.

Figure 2:
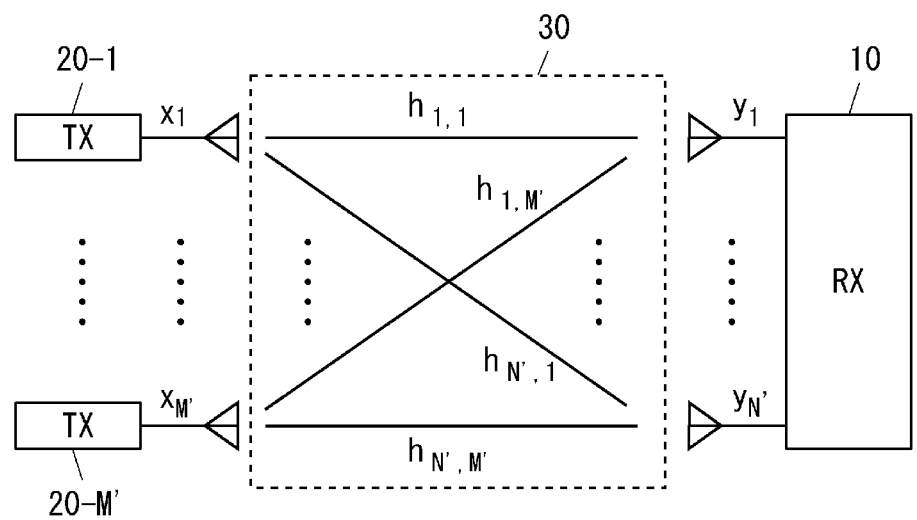
FIG. 2 is a diagram showing a system model according to the first example embodiment.

FIG. 2 shows an example of a system model of uplink multi-user MIMO transmission. In FIG. 2, transmitters 20 of the respective wireless terminals 2 communicate with a receiver 10 of the base station 1 through a channel (propagation path) 30. In the example shown in FIG. 2, each of the M' transmitters 20 has one transmitting antenna. Alternatively, each transmitter 20 may have two or more transmitting antennas. The receiver 10 of the base station 1 has N' receiving antennas. The total number of transmitting antennas M' is assumed to be less than the total number of receiving antennas N'.

In the following description, for the sake of simplicity, it is assumed that the transmitted signal from each radio terminal 2 (or each user) is a single carrier transmitted signal and the propagation path between each radio terminal 2 and the base station 1 is a flat-fading channel. Incidentally, in a multipath-fading environment where the transmitted signal from each user uses Orthogonal Frequency Division Multiplexing (OFDM), Single Carrier-Frequency Division Multiple Access (SC-FDMA) or the like, it may also be assumed that the propagation path of each subcarrier is a flat-fading channel by inserting a cyclic prefix having an appropriate length into the transmitted signal. Accordingly, this example embodiment may be applied to OFDM and SC-FDMA.

Quadrature amplitude modulation (QAM) modulated transmitted signals are transmitted from the M' transmitting antennas of the plurality of radio terminals 2 and received by the base station 1 equipped with the N' receiving antennas. In this case, using the equivalent low-pass representation, a complex valued signal model can be expressed by Equation (1) as follows:

$$y^c = H^c x^c + z^c \qquad (1)$$

where $y^c$ is an N'×1 complex received signal vector consisting of the received signals of the N' antennas, $H^c$ is an N'×M' complex MIMO channel matrix, $z^c$ is an N'×1 complex additive white noise vector, and $x^c$ is an M'×1 complex transmitted signal vector.

Denoting the number of the QAM modulation symbols as Q', Q' is equal to 4 in Quadrature Phase Shift Keying (QPSK), while Q' is equal to 16 in 16QAM. It is assumed that the amplitude of the modulation symbol of each of the I axis and the Q axis is {+c, −c} in QPSK and it is {+c, −c, +3c, −3c} in 16QAM. The value c can be expressed by Equation (2) as follows:

$$c = \sqrt{\frac{3E_s}{2(Q'-1)}} \qquad (2)$$

where $E_s$ is average signal power. The power of complex noise in each of the receiving antennas is denoted by $N_0$.

Figure 3:
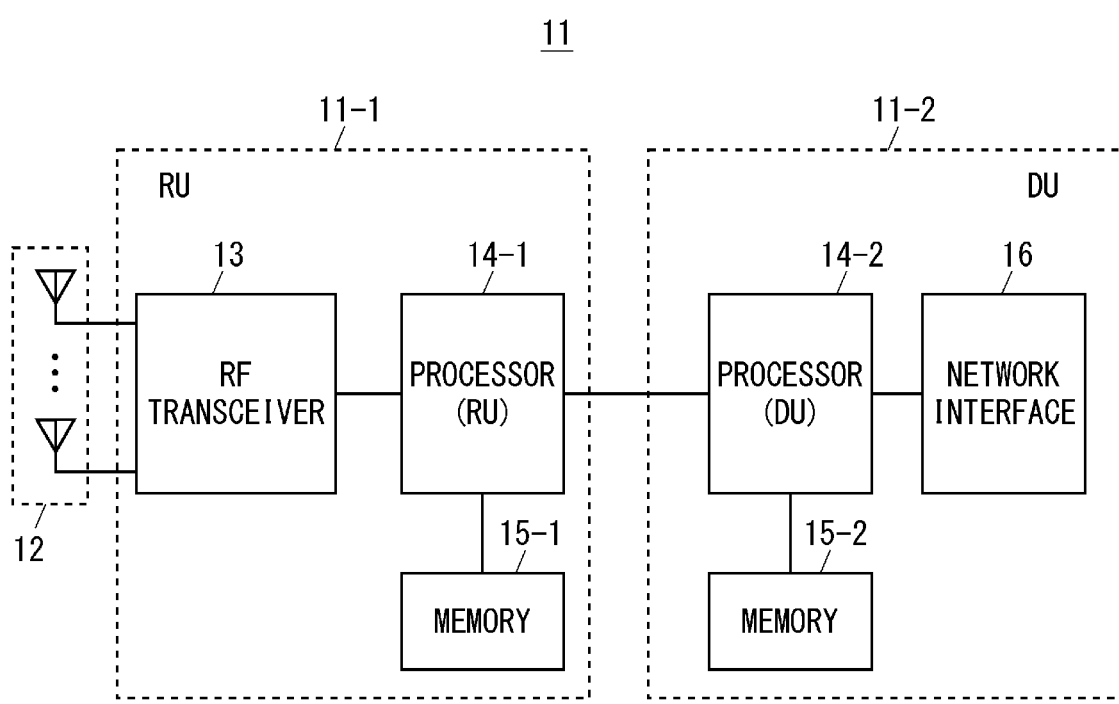
FIG. 3 is a diagram showing an example configuration of a base station according to the first example embodiment.

FIG. 3 shows an example configuration of the base station 1. Referring to FIG. 3, the base station 1 includes an RU 11-1 and a DU 11-2. The RU 11-1 includes an RF transceiver 13, a processor 14-1, and a memory 15-1 and is connected to an antenna array 12. The DU 11-2 includes a processor 14-2, a memory 15-2, and a network interface 16.

The RF transceiver 13 performs analog RF signal processing to communicate with multiple radio terminals 2. The RF transceiver 13 may include a plurality of transceivers. The RF transceiver 13 is coupled to the antenna array 12, the processor 14-1 in the RU 11-1 and the processor 14-2 in the DU 11-2. The RF transceiver 13 receives modulation symbol data from the processor 14-1 in the RU11-1 and generates and suppliers transmit RF signals to the antenna array 12. The RF transceiver 13 also generates baseband received signals based on received RF signals received by the antenna array 12, and supplies the receive signals to the processor in the DU 11-2 if the received signals are reference signals, or to the processor 14-1 in the RU 11-1 if the received signals are data signals.

The processors 14-1 and 14-2 perform digital baseband signal processing (or data plane processing) and control plane processing for radio communication. Each of the processors 14-1 and 14-2 may include multiple processors. The processors 14-1 and 14-2 may include a modem processor for digital baseband signal processing (e.g., Central Processing Unit (CPU), Graphics Processing Unit (GPU), or Digital Signal Processor (DSP)) and a protocol stack processor for control plane processing (e.g., Central Processing Unit (CPU) or Micro Processing Unit (MPU)).

For example, digital baseband signal processing performed by the processors 14-1 and 14-2 may include signal processing of Service Data Adaptation Protocol (SDAP), Packet Data Convergence Protocol (PDCP), Radio Link Control (RLC), Medium Access Control (MAC), and Physical (PHY) layers. Meanwhile, control plane processing performed by the processors 14-1 and 14-2 may include processing of Non-Access Stratum (NAS) messages, Radio Resource Control (RRC) messages, Medium Access Control (MAC) Control Elements (CEs), and Downlink Control Information (DCI).

The network interface 16 is used to communicate with network nodes (e.g., another base station, a Centralized Unit (CU), and a core network node). The network interface 16 may include, for example, a network interface card (NIC) conforming to the IEEE 802.3 series.

Each of the memories 15-1 and 15-2 is composed of a combination of volatile and nonvolatile memories. The volatile memory is, for example, Static Random Access Memory (SRAM) or Dynamic RAM (DRAM) or a combination thereof. The non-volatile memory is, for example, Mask Read Only Memory (MROM), Electrically Erasable Programmable ROM (EEPROM), flash memory, or hard disk drive, or any combination thereof. Each of the memories 15-1 and 15-2 may include storage located away from the processors 14-1 and 14-2. In this case, the processors 14-1 and 14-2 may access the memories 15-1 and 15-2 respectively via the network interface 16 or another I/O interface.

One or both of the memory 15-1 and 15-2 may include a computer-readable medium containing one or more software modules (computer programs) containing a set of instructions and data for performing at least some of the processing by the base station 1. In some implementations, processors 14-1 and 14-2 may be configured to read and execute such software modules from the memories 15-1 and 15-2, respectively, to perform at least some of the processing by the base station 1 described in this example embodiment.

Figure 4:
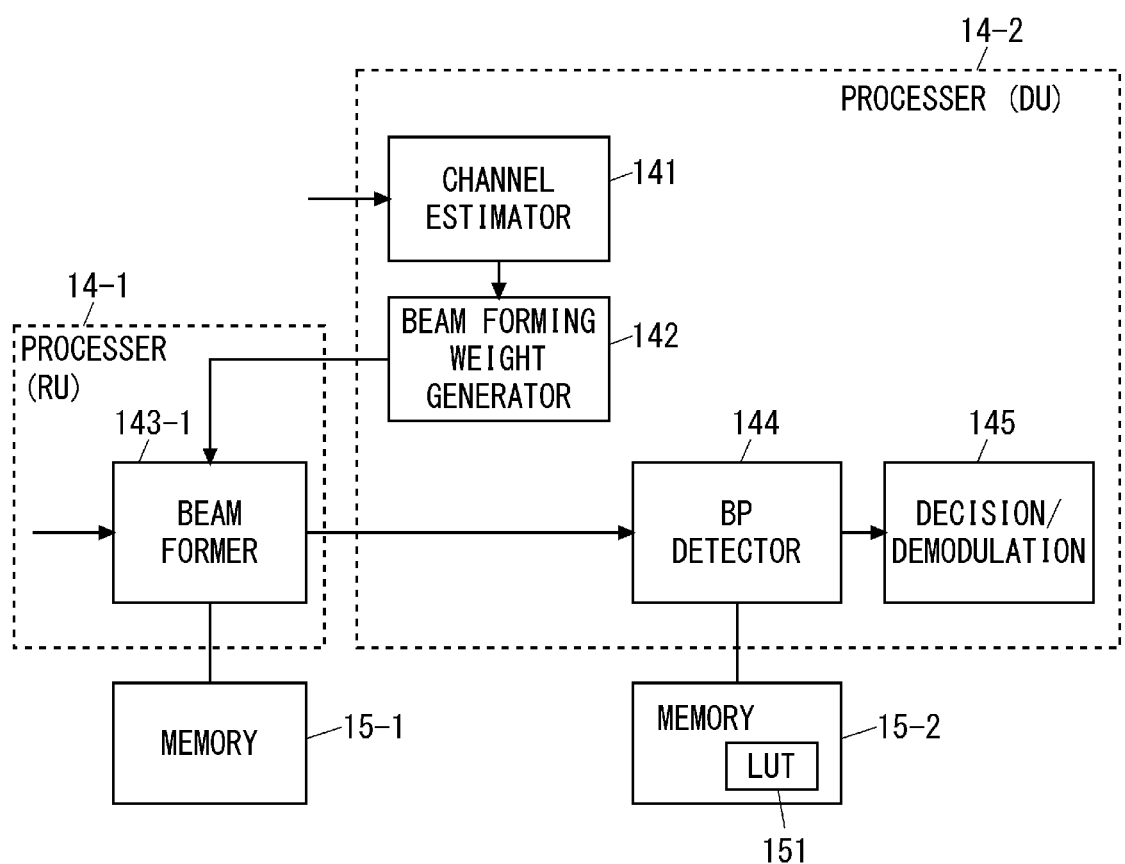
FIG. 4 is a diagram showing an example configuration of a processor of a base station according to the first example embodiment.
Figure 5:
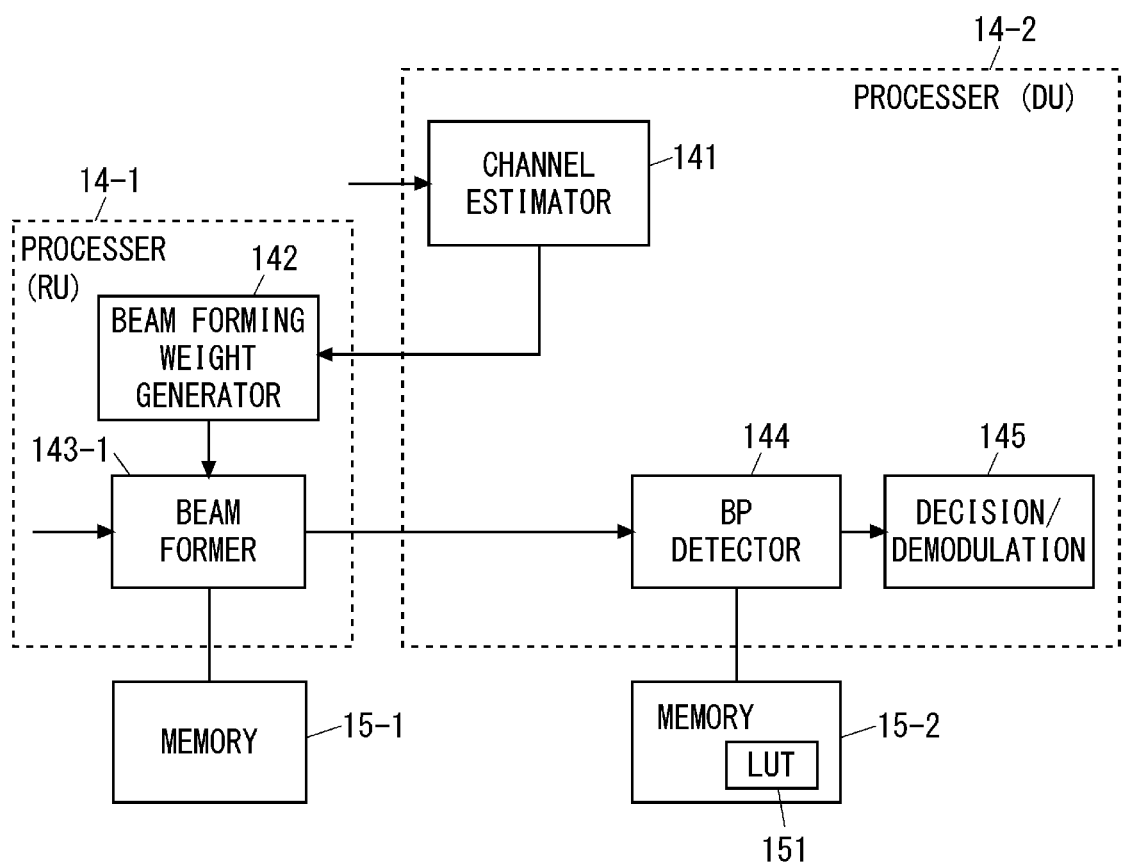
FIG. 5 is a diagram showing an example configuration of a processor of a base station according to the first example embodiment.
Figure 6:
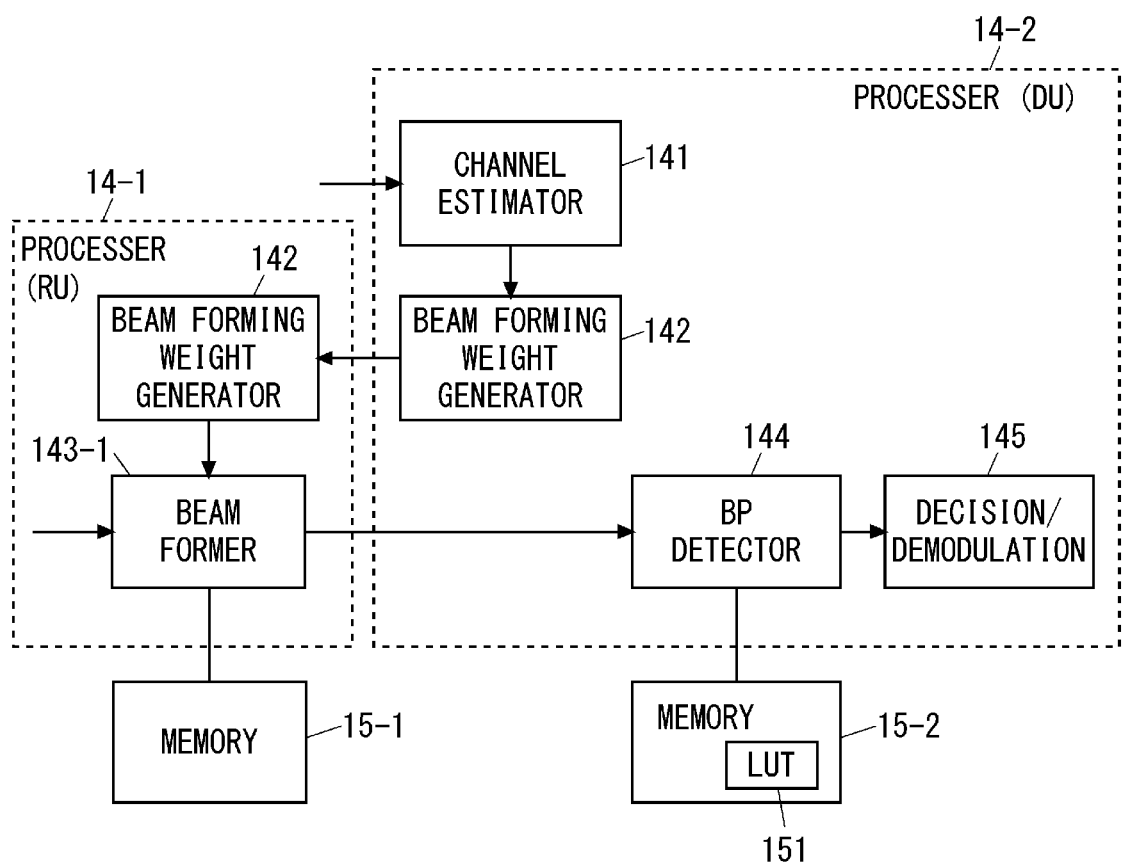
FIG. 6 is a diagram showing an example configuration of a processor of a base station according to the first example embodiment.
Figure 7:
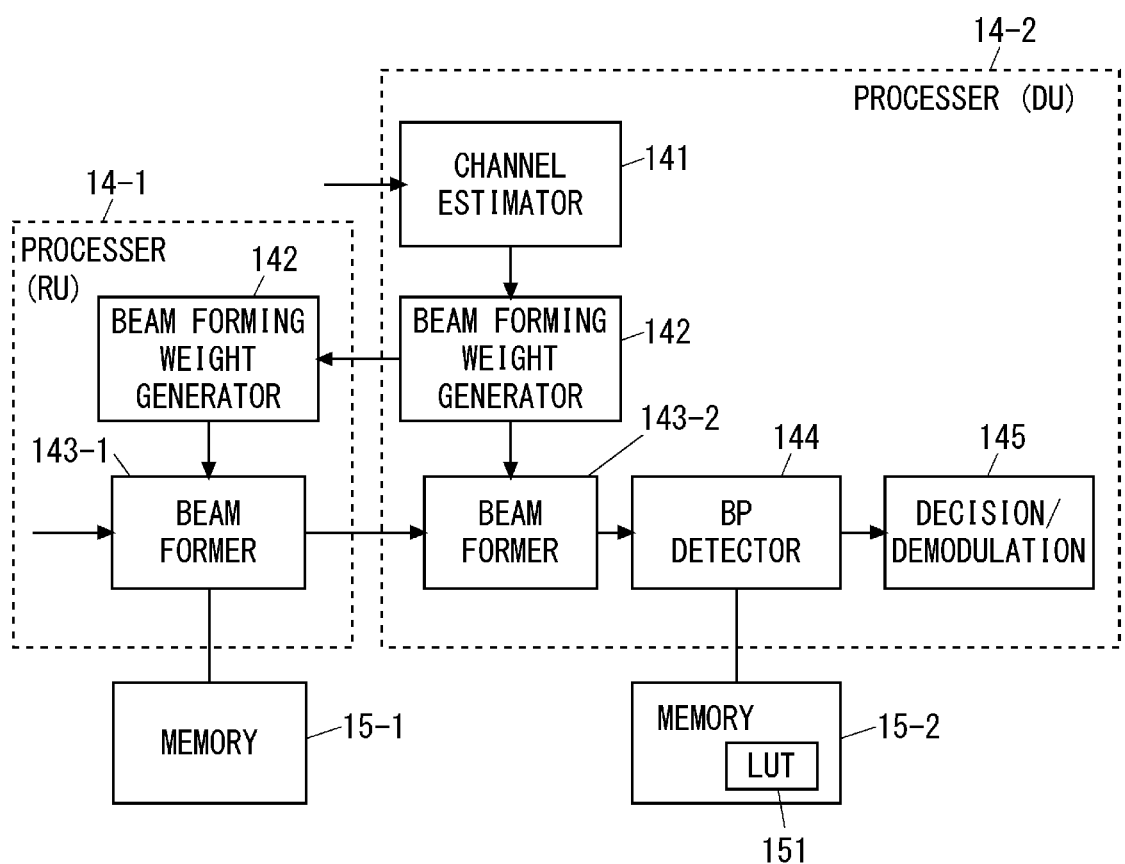
FIG. 7 is a diagram showing an example configuration of a processor of a base station according to the first example embodiment.
Figure 8:
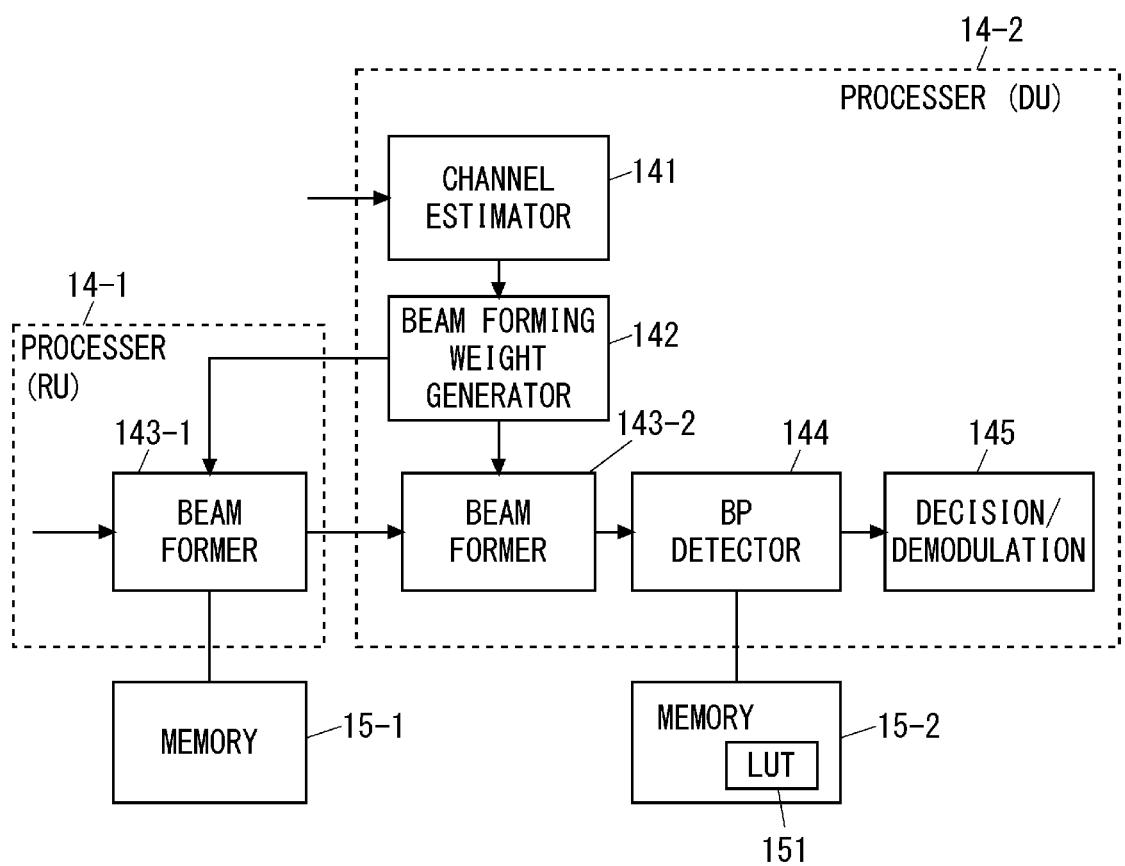
FIG. 8 is a diagram showing an example configuration of a processor of a base station according to the first example embodiment.

According to this example embodiment, the processors 14-1 and 14-2 can cause the base station 1 to perform signal processing for receive beamforming and multiuser detection (MIMO detection). To this end, as shown in FIG. 4, the processor 14-1 in the RU 11-1 may include a beamformer 143-1, while the processor 14-2 in the DU 11-2 may include a channel estimator 141, a beamforming weight generator 142, and a BP detector 144. Additionally or alternatively, as shown in FIG. 5, FIG. 6 and FIG. 7, the processor 14-1 may include a beamforming weight generator 142, and as shown in FIG. 7 and FIG. 8, the processor 14-2 may include a beamformer 143-2.

The channel estimator 141 estimates the MIMO channel for generating beamforming weights based on the reference signals received from the RF transceiver 13. The channel estimator 141 is coupled with the beamforming weight generator 142 and provides the estimated channel matrix $H^c$ to the beamforming weight generator 142.

The beamforming weight generator 142 generates a weight matrix W to be used for digital beamforming, based on the channel matrix $H^c$ received from the channel estimator 141. The beamforming weight generator 142 is coupled to the beamformer 143-1 and provides the weight matrix W to the beamformer 143-1. The N'×M' channel matrix $H^c$ can be decomposed into an N'×B' matrix W and a B'×M' matrix $H'^c$ as shown in Equation (3):

$$H^c = W H'^c \quad (3)$$

where W is the weight matrix and $H'^c$ is the equivalent channel matrix after receive beamforming. B' is the number of the receive-beamformed received signals and is an integer less than or equal to N'−1 and more than or equal to M'. The weight matrix W is a matrix whose columns, corresponding to the elements of the receive-beamformed received signal vector, are orthogonal to each other. The matrix $H'^c$ must contain two or more non-zero matrix elements in its each column due to the nature of the BP detector 144 described below. As the columns of the matrix W are orthogonal to each other, the product of the Hermitian conjugate of the matrix W and the matrix W is the unit matrix, as shown in Equation (4):

$$W^H W = I \quad (4)$$

Furthermore, the weight matrix W may be a combination of an N'×B' sub-weight matrix $W_1$ and at least one second sub-weight matrix, where the product of the sub-weight matrix $W_1$ and the at least one second sub-weight matrix is equal to the weight matrix W. In this case, the sub-weight matrix $W_1$ is fed to the beamformer 143-1 in the RU 11-1 and the sub-weight matrix $W_2$ is fed to the beamformer 143-2 in the DU 11-2. For example, the weight matrix W may be the product of the N'×B' sub-weight matrix $W_1$ and the B'-order square matrix (sub-weight matrix $W_2$), as shown in Equation (5):

$$W = W_1 W_2 \quad (5)$$

In the first implementation example of the beamforming weight generator 142, assuming that B' is equal to M', the channel matrix $H^c$ is decomposed by QR decomposition into an N'×M' matrix Q and an M'×M' upper triangular matrix R, as shown in Equation (6):

$$H^c = QR \quad (6)$$

where from the definition of QR decomposition, the columns of the matrix Q are orthogonal to each other. In this case, the matrix W is the product of the matrix Q and an M'-order unitary matrix U', and the matrix $H'^c$ is the product of the Hermitian conjugate of the matrix U' and an upper triangular matrix R, as shown in Equations (7):

$$W = QU', H'^c = U'^H R \quad (7)$$

where the unitary matrix U' shall be a unitary matrix with two or more non-zero matrix elements in its first column. This is because each column of the square matrix $H'^c$ is required to have two or more non-zero matrix elements. For example, the Discrete Fourier Transform (DFT) matrix can be used as the unitary matrix. Although the GaBP algorithm, one of the BP algorithms described below, is based on the operating assumption of whiteness of the observed noise, due to the mutual orthogonality of the columns of the weight matrix W, the noise after receive beamforming also remains white and allows detection by the GaBP algorithm. The matrix Q may be the sub-weight matrix $W_1$ and the unitary matrix U' may be the sub-weight matrix $W_2$, as shown in Equations (8):

$$W_1 = Q, W_2 = U' \quad (8)$$

In the second implementation example of the beamforming weight generator 142, assuming that B' is equal to M', the channel matrix $H^c$ is decomposed by singular value decomposition into an N'×M' matrix U consisting of M' left singular vectors, an M'-order diagonal matrix E whose matrix element in the i-th row and i-th column is the i-th singular value, and the Hermitian conjugate of an M'-order unitary matrix V consisting of M' right singular vectors, as shown in Equations (9):

$$H^c = U\Sigma V^H, W = U, H'^c = \Sigma V^H \quad (9)$$

where the columns of matrix U are orthogonal to each other due to the nature of left singular vectors, and the product of matrix $\Sigma$ and the Hermitian conjugate of matrix V is an M'-order square matrix. As further represented by Equations (9), the matrix U is the weight matrix W and the product of the matrix $\Sigma$ and the Hermitian conjugate of the matrix V is the square matrix $H'^c$. In addition, the matrix W may be the product of the matrix U obtained by singular value decomposition and any M'-order unitary matrix U', while the square matrix $H'^c$ may be the product of the Hermitian conjugate of the unitary matrix U', the matrix $\Sigma$, and the matrix V, as shown in Equations (10):

$$W = UU', H'^c = U'^H \Sigma V^H \quad (10)$$

The matrix U consisting of the left singular vectors may be the sub-weight matrix $W_1$ and the unitary matrix U' may be the sub-weight matrix $W_2$, as shown in Equations (11):

$$W_1 = U, W_2 = U' \quad (11)$$

In the third implementation example, assuming that B' is equal to M', the channel matrix $H^c$ is decomposed into the product of the matrix $H^c$ with the $-\frac{1}{2}$ power of the Gram matrix of the matrix $H^c$ and the $\frac{1}{2}$ power of the Gram matrix of the matrix $H^c$, as shown in Equation (12):

$$H^c = [H^c(H^{cH}H^c)^{-1/2}][(H^{cH}H^c)^{1/2}] \quad (12)$$

Where the Gram matrix is the product of the Hermitian conjugate of the matrix $H^c$ with the matrix $H^c$. In this case, the product of the matrix Hc and the $-\frac{1}{2}$ power of the Gram matrix of the matrix $H^c$ is the matrix W, and the $\frac{1}{2}$ power of the Gram matrix of the matrix $H^c$ is the matrix $H'^c$, as shown in Equations 13:

$$W = H^c(H^{cH}H^c)^{-1/2}, H'^c = (H^{cH}H^c)^{1/2} \quad (13)$$

Indeed, it can be verified that the columns of the weight matrix W are orthogonal to each other and that the product of the Hermitian conjugate of the matrix W and the matrix W is the unit matrix, as shown in Equation (14):

$$W^H W = [(H^{cH}H^c)^{-1/2}]^H H^{cH} H^c (H^{cH}H^c)^{-1/2} = I_M \quad (14)$$

The channel matrix $H^c$ may be the sub-weight matrix $W_1$, and the $-\frac{1}{2}$ power of the Gram matrix of the channel matrix $H^c$ may be the sub-weight matrix $W_2$, as shown in Equations (15):

$$W_1 = H^c, W_2 = (H^{cH}H^c)^{-1/2} \quad (15)$$

The matrix W may be the product of the matrix $H^c$, the $-\frac{1}{2}$ power of the Gram matrix of the matrix $H^c$, and any M'-order unitary matrix U', as shown in Equation (16):

$$W = H^c(H^{cH}H^c)^{-1/2}U' \quad (16)$$

The channel matrix $H^c$ may be the sub-weight matrix $W_1$, while the product of the $-\frac{1}{2}$ power of the Gram matrix of the channel matrix $H^c$ with any M'-order unitary matrix U' may be the sub-weight matrix $W_2$, as shown in Equations (17):

$$W_1 = H^c, W_2 = (H^{cH}H^c)^{-1/2}U' \quad (17)$$

Alternatively, the product of the channel matrix $H^c$ with the $-\frac{1}{2}$ power of the Gram matrix of $H^c$ may be the sub-weight matrix W1, while any M'-order unitary matrix U' may be the sub-weight matrix W2, as shown in Equations (18):

$$W_1 = H^c(H^{cH}H^c)^{-1/2}, W_2 = U' \quad (18)$$

In the fourth implementation example, it is assumed that the channel matrix $H^c$ consists of K $N'_k \times M'$ sub-matrices $H^c_k$, as shown in Equation (19):

$$H^c = \begin{pmatrix} H^c_1 \\ \vdots \\ H^c_k \\ \vdots \\ H^c_K \end{pmatrix} \quad (19)$$

Under this assumption, each sub-matrix $H^c_k$ is decomposed into an $N'_k \times B'_k$ matrix $W_k$ whose columns are orthogonal to each other and a $B'_k \times M'$ matrix $H'^c_k$, as shown in Equation (20):

$$H^c_k = W_k H'^c_k \quad (20)$$

where k is an integer from 1 to K and $B'_k$ and $B'_k$ is the smaller of $N'_k$ and M'. The decomposition of the matrix in Equation (20) may be done using one of the decompositions in the first to third implementation examples described above.

The weight matrix W is defined as a block diagonal matrix consisting of a set of sub-matrices $W_k$, as shown in Equation (21):

$$W = \begin{pmatrix} W_1 & \cdots & 0 & \cdots & 0 \\ \vdots & \ddots & \vdots & & \vdots \\ 0 & \cdots & W_k & \cdots & 0 \\ \vdots & & \vdots & \ddots & \vdots \\ 0 & \cdots & 0 & \cdots & W_K \end{pmatrix} \quad (21)$$

The equivalent channel matrix after receive beamforming consists of multiple sub-matrices $H'^c_k$ as shown in Equation (22):

$$H'^c = \begin{pmatrix} H'^c_1 \\ \vdots \\ H'^c_k \\ \vdots \\ H'^c_K \end{pmatrix} \quad (22)$$

The matrices $H^c$, W, and $H'^c$ have the relationships shown in Equations (3) and (4).

The weight matrix W is an $N' \times B'$ matrix, where B' is the sum of $B'_1$ through $B'_K$ as shown in Equation (23):

$$B' \Sigma_{k=1}^L B'_k \quad (21)$$

The implementation of the beamforming weight generator 142 is not limited to the implementation examples described above.

The beamformer 143-1 performs receive beamforming on the received signal vector $y^c$, which consists of the received signals of N' receiving antennas supplied by the RF transceiver 13. The receive beamforming uses the weight matrix W or sub-weight matrix $W_1$ received from the beamforming weight generator 142. More specifically, the receive beamforming may be performed by taking the product of the Hermitian conjugate of the weight matrix W and the received signal vector $y^c$, as shown in Equation (24):

$$y'^c = W^H y^c \quad (24)$$

The beamformer 143-1 is coupled to the BP detector 144 and provides the signal vector $y'^c$ via the fronthaul. Instead, if the DU 11-2 includes the beamformer 143-2, the beamformer 143-1 in the RU 11-1 provides signals via the fronthaul to the beamformer 143-2 in the DU 11-2, and the beamformer 143-2 in the DU 11-2 provides the signal vector $y'^c$ to the BP detector 144.

The BP detector 144 executes a BP algorithm with the total number of iterations T on the post-receive beamforming received signal vector $y'^c$ supplied from beamformer 143-1 or 143-2. Here, the BP algorithm is an algorithm that includes an interference rejection process using replicas of transmitted signals and assumes that the residual interference noise component in the received signals after the interference cancellation approximates a Gaussian distribution according to the Central Limit Theorem. The BP algorithm may be, for example, GaBP, Generalized Approximate Message Passing (GAMP), or Expectation Propagation. The post-receive beamforming equivalent channel matrix $H'^c$ shown in Equation (25) is used to detect the transmitted signals:

$$H'^c = W^H H^c = W_2{}^H(W_1{}^H H^c) \tag{25}$$

The post-receive beamforming equivalent channel matrix $H'^c$ may be estimated using demodulation reference signals received separately from the reference signals used to generate the beamforming weights.

For simplicity of explanation, the equivalent low-pass complex representation is replaced by the equivalent real-valued received signal model shown in Equations (26) to (30):

$$y' = H'x + z' \tag{26}$$

$$y' = \begin{bmatrix} \mathcal{R}(y^c) \\ \mathcal{J}(y^c) \end{bmatrix} \tag{27}$$

$$x = \begin{bmatrix} \mathcal{R}(x^c) \\ \mathcal{J}(x^c) \end{bmatrix} \tag{28}$$

$$z = \begin{bmatrix} \mathcal{R}(z^c) \\ \mathcal{J}(z^c) \end{bmatrix} \tag{29}$$

$$H' = \begin{bmatrix} \mathcal{R}(H'^c) & -\mathcal{J}(H'^c) \\ \mathcal{J}(H'^c) & \mathcal{R}(H'^c) \end{bmatrix} \tag{30}$$

where y' is a B×1 equivalent real received signal vector after receive beamforming, H' is a B×M equivalent real MIMO channel matrix after receive beamforming, z' is a B×1 equivalent real noise vector after receive beamforming, and x is an M×1 equivalent real transmitted signal vector. The value M is equal to 2 M', while the value B is equal to 2B'. Each transmitted signal is equivalent to a Pulse Amplitude Modulation (PAM) modulation symbol with the number of modulation symbols Q, and its average signal power is $E_s/2$. Q is equal to the square root of Q'. The post-receive beamforming complex noise vector $z^{c'}$ is related to the noise vector $z^c$ consisting of the noise of N' receiving antennas in Equation (31):

$$z^{c'} = W^H z^c = W_2{}^H(W_1{}^H z^c) \tag{31}$$

The noise power in each element of the equivalent real noise vector z' after receive beamforming is $N_0/2$.

The equivalent real-valued model will be used in the following.

The BP detector 144 may perform the GaBP algorithm, which is one of the BP algorithms, and the GaBP algorithm may use a parameter set. The parameter set may include one or any combination of a plurality of scaling factors, a plurality of damping factors, and a plurality of weight factors. In some implementations, the GaBP algorithm uses a first parameter set that includes a plurality of scaling factors and a plurality of damping factors. The BP detector 144 uses these scaling factors in respective different iterations in the GaBP algorithm. Likewise, the BP detector 144 uses these damping factors in respective different iterations in the GaBP algorithm. Accordingly, the total number of scaling factors and the total number of damping factors may each be equal to the total number of iterations of the GaBP algorithm.

In other implementations, the GaBP algorithm uses a second parameter set that includes a plurality of scaling factors and a plurality of weight factors. The BP detector 144 uses these scaling factors in respective different iterations in the GaBP algorithm. Likewise, the BP detector 144 uses these weight factors in respective different iterations in the GaBP algorithm. As will be described later, the GaBP algorithm may use a plurality of weight factors per iteration. In this case, the second parameter set may include a set of weight factors per iteration.

The first parameter set (or the second parameter set) is stored in one or both of the memories 15-1 and 15-2 of the base station 1. As shown in FIGS. 4 to 8, the first parameter set (or the second parameter set) may be stored in the memory 15-2 as a Lookup Table (LUT) 151.

Figure 9:
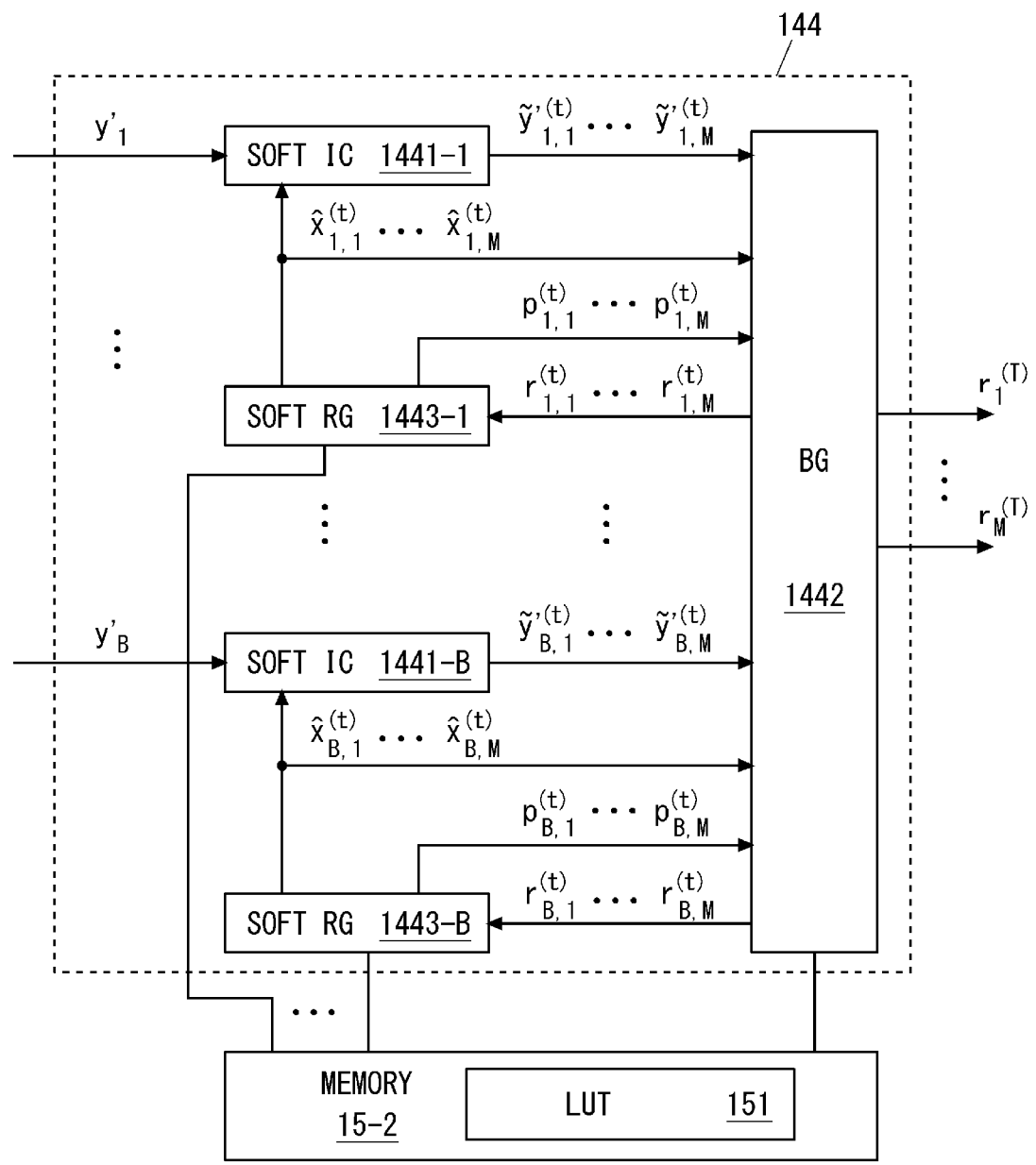
FIG. 9 is a diagram showing an example configuration of a BP detector according to the first example embodiment.

The following provides a description of an example configuration of the BP detector 144. FIG. 9 shows an example configuration of the BP detector 144 that implements the GaBP algorithm. Referring to FIG. 9, the BP detector 144 includes B soft interference cancellers 1441-1 to 1441-B, a belief generator 1442, and B soft replica generators 1443-1 to 1443-B. The soft interference cancellers 1441-1 to 1441-B respectively receive received signals $y'_1$ to $y'_B$ from the beamformers 143-1 or 143-2. For example, the soft interference canceller 1441-1 receives the first received signal $y'_1$ after receive beamforming. In addition, in order to perform the t-th iteration, the soft interference canceller 1441-1 receives soft replicas x $\text{hat}_{1,1}{}^{(t-1)}$ to x $\text{hat}_{1,M}{}^{(t-1)}$ of all the transmitted signals generated in the previous (t−1)-th iteration. Here, x hat means letter x with circumflex (ˆ). The soft interference canceller 1441-1 then generates post-cancellation received signals y' $\text{tilde}_{1,1}{}^{(t)}$ to y' $\text{tilde}_{1,M}{}^{(t)}$. Here, y' tilde means letter y' with a tilde (~) above.

The belief generator 1442 reads the damping factors (or the sets of weight factors) included in the above-described first parameter set (or the second parameter set) from the LUT 151. The belief generator 1442 receives the post-cancellation received signals y' $\text{tilde}_{1,1}{}^{(t)}$ to y' $\text{tilde}_{1,M}{}^{(t)}$ from the soft interference canceller 1441-1. The belief generator 1442 also receives post-cancellation received signals y' $\text{tilde}_{b,1}{}^{(t)}$ to y' $\text{tilde}_{b,M}{}^{(t)}$ similarly generated by each of the remaining soft interference cancellers 1441-b (where b is between 2 and B). The belief generator 1442 then generates beliefs $r_{1,1}{}^{(t)}$ to $r_{1,M}{}^{(t)}$ associated with the first received signal using the damping factor (or the set of weight factors) for the t-th iteration. Likewise, the belief generator 1442 generates beliefs associated with each of the remaining second to B-th received signals.

The soft replica generator 1443-1 reads the scaling factors included in the above-described first parameter set (or the second parameter set) from the LUT 151. The soft replica generator 1443-1 receives the beliefs $r_{1,1}{}^{(t)}$ to $r_{1,M}{}^{(t)}$ associated with the first received signal from the belief generator 1442. The soft replica generator 1443-1 then generates soft replicas x $\hat{}_{1,1}^{(t)}$ to x $\hat{}_{1,M}^{(t)}$ and generates soft replica's power $p_{1,1}^{(t)}$ to $p_{1,M}^{(t)}$, using the scaling factor for the t-th iteration.

After completion of the GaBP process with T total iterations, the belief generator 1442 provides the estimated values $r_1^{(T)}$ to $r_M^{(T)}$ of the M separated transmitted signals to the decision and demodulator 145.

The following provides further details on the processing performed by the soft interference cancellers 1441-1 to 1441-B, belief generator 1442, and soft replica generators 1443-1 to 1443-B.

(1) Soft Interference Cancellers 1441-1 to 1441-B

In the first iteration, soft replicas have not yet been generated. The soft interference cancellers 1441-1 to 1441-B thus supplies the first to B-th received signals to the belief generator 1442 without performing cancellation processing. In the t-th iteration, which is the second or any subsequent iteration, the soft interference canceller 1441-b associated with the b-th received signal cancels M−1 transmitted signal components other than the m-th transmitted signal from the b-th received signal and generates the post-cancellation received signal y' $\tilde{}_{b,m}^{(t)}$. The post-cancellation received signal y' $\tilde{}_{b,m}^{(t)}$ is given by Equation (32) as follows:

$$\tilde{y}'_{b,m}{}^{(t)} = y'_b - \Sigma_{j=1,j\neq m}^M h'_{b,j}\hat{x}_{b,j}{}^{(t-1)} \qquad (32)$$

where y'$_b$ is the b-th received signal after receive beamforming, h'$_{b,j}$ is a channel response between the j-th transmitted signal and the b-th received signal after receive beamforming, and x $\hat{}_{b,j}^{(t-1)}$ is a soft replica of the transmitted signal of the j-th transmitted signal obtained in the (t−1)-th iteration process. As already explained, the base station 1 is able to estimate the channel response using the reference signal transmitted from the radio terminal 2. The post-cancellation received signal y' $\tilde{}_{b,m}^{(t)}$ is supplied to the belief generator 1442.

(2) Belief Generator 1442

The belief generator 1442 generates beliefs using the post-cancellation received signals. First, the belief generator 1442 performs processing using the post-cancellation received signal y' $\tilde{}_{b,m}^{(t)}$ regarding the b-th received signal, thereby obtaining a transmitted signal component $s_{b,m}^{(t)}$ in the t-th iteration, as expressed by Equation (33):

$$s_{b,m}^{(t)} = \frac{h'_{b,m}\tilde{y}'_{b,m}^{(t)}}{\psi_{b,m}^{(t)}} \qquad (33)$$

where $\Psi_{b,m}^{(t)}$ is a residual interference and noise power in the cancellation process. The residual interference and noise power $\Psi_{n,m}^{(t)}$ is obtained by Equations (34) and (35):

$$\psi_{b,m}^{(t)} = \left[\sum_{j=1,j\neq m}^M h_{b,j}^2 \delta_{b,j}^{(t)}\right] + \frac{N_0}{2} \qquad (34)$$

$$\delta_{b,j}^{(t)} = p_{b,j}^{(t-1)} - (\hat{x}_{b,j}^{(t-1)})^2 \qquad (35)$$

where $p_{b,j}^{(t-1)}$ is the power of the soft replica. As already explained, the soft replica power is generated by the soft replica generators 1443-1 to 1443-B.

The equivalent gain $\omega_{b,m}^{(t)}$ to the true transmitted signal $x_m$ included in the transmitted signal component $s_{b,m}^{(t)}$ is used for normalization in the scaling processing and is given by Equation (36):

$$\omega_{b,m}^{(t)} = \frac{h'^2_{b,m}}{\psi_{b,m}^{(t)}} \qquad (36)$$

Equations 33 and 36 are obtained by applying Gaussian approximation to the residual interference noise component in the cancellation process under the large-system assumption. Therefore, if the number of transmitted signals in the residual interference component is smaller, the accuracy of the Gaussian approximation deteriorates and the accuracy of the beliefs also deteriorates. It is thus desirable to include two or more non-zero matrix elements in each column of the beamformed channel matrix H'$^c$.

Next, the belief generator 1442 generates a belief $r_{b,m}^{(t)}$ using the transmitted signal component $s_{b,m}^{(t)}$. The belief generator 1442 uses either the damping processing or the node selection processing. The damping processing calculates the weighted average of the transmitted signal component obtained in the previous (t−1)-th iteration and the transmitted signal component obtained in the current t-th iteration by using the damping factor $\eta^{(t)}$ as shown in Equation (37):

$$s'_{b,m}{}^{(t)} = \eta^{(t)}\Sigma_{i=1,i\neq b}^B s_{i,m}^{(t)} + (1-\eta^{(t)})s'_{b,m}{}^{(t-1)} \qquad (37)$$

where $s'_{b,m}{}^{(t)}$ is a transmitted signal component after the damping processing. As a result of this damping processing, the equivalent gain included in $s'_{b,m}{}^{(t)}$ is given by Equation (38):

$$\omega'_{b,m}{}^{(t)} = \eta^{(t)}\Sigma_{i=1,i\neq b}^B \omega_{i,m}^{(t)} + (1-\eta^{(t)})\omega'_{b,m}{}^{(t-1)} \qquad (38)$$

On the other hand, the node selection processing yields $s'_{b,m}{}^{(t)}$, which is a composite of the transmitted signal components associated with the received signal in each beam region in the latest K iterations, according to Equation (39):

$$s'_{b,m}{}^{(t)} = \Sigma_{k=0}^{K-1}\Sigma_{i=1,i\neq b}^B \eta_{i,t-k}^{(t)} s_{i,m}^{(t-k)}, s \cdot t \cdot \Sigma_{k=0}^{K-1}\eta_{i,t-k}^{(t)}$$
$$= 1 \qquad (39)$$

where $\eta_{i,t-k}^{(t)}$ is a weight factor indicating how much the transmitted signal component $s_{i,m}^{(t-k)}$ is considered in the t-th iteration. In the existing node selection method, the value of the weight factor $\eta_{i,t-k}^{(t)}$ is either 0 or 1, which means that it is alternatively determined whether or not to take the node i (i.e., observation node, or received signal after beamforming) into account. In contrast, in Equation (39), the weight factor $\eta_{i,t-k}^{(t)}$ is a real number value between 0 and 1 (or a real number value not less than 0 and not greater than 1). This allows the weight factor $\eta_{i,t-k}^{(t)}$ to finely adjust how much the transmitted signal component $s_{i,m}^{(t-k)}$ associated with the received signal y'$_1$, in the i-th beam region is considered in the t-th iteration. When K=t in Equation (39), the transmitted signal components obtained in all the past iterations are considered.

Using the weight factor $\eta_{i,t-k}^{(t)}$, the equivalent gain contained in $s'_{b,m}{}^{(t)}$ is expressed by Equation (40):

$$\omega'_{b,m}{}^{(t)} = \Sigma_{k=0}^{K-1}\Sigma_{i=1,i\neq b}^B \eta_{i,t-k}^{(t)} \omega_{i,m}^{(t)} \qquad (40)$$

The belief generator 1442 normalizes $s'_{b,m}{}^{(t)}$ obtained by either process with $\omega'_{b,m}{}^{(t)}$, thereby generating a normalized belief $r'_{b,m}{}^{(t)}$, which is then fed to the soft replica generators 1443-1 to 1443-B. The normalized belief $r_{b,m}^{(t)}$ is expressed by Equation (41):

$$r_{b,m}^{(t)} = s'_{b,m}{}^{(t)}/\omega'_{b,m}{}^{(t)} \qquad (41)$$

(3) Soft Replica Generators 1443-1 to 1443-B

The soft replica generators 1443-1 to 1443-B each scale the belief $r_{b,m}^{(t)}$ with a scaling factor $a^{(t)}$ and generate the soft replica x hat$_{b,m}^{(t)}$ and soft replica power $p_{b,m}^{(t)}$ according to Equations (42) and (43) below:

$$\hat{x}_{b,m}^{(t)} = c \sum_{k' \in S_Q} \tanh\left(\frac{a^{(t)}}{c}(r_{b,m}^{(t)} - s')\right) \quad (42)$$

$$p_{b,m}^{(t)} = E_s^{max} + 2c \sum_{k' \in S_Q} s' \tanh\left(\frac{a^{(t)}}{c}(r_{b,m}^{(t)} - s')\right) \quad (43)$$

where $E_s^{max}$ is the power of the largest PAM symbol that the transmitted signal can take and s' is a decision threshold for PAM modulation. The value $E_s^{max}$ is given by Equation (44):

$$E_s^{max} = (\sqrt{Q}-1)^2 c^2 \quad (44)$$

The decision threshold s' can take any value in a set of decision thresholds $S_Q$. The set $S_Q$ is {0} for QPSK and {0, +2c, −2c} for 16QAM. The tanh function is a hyperbolic tangent function. These equations indicate that the soft replica x hat$_{b,m}^{(t)}$ and the soft replica power $p_{b,m}^{(t)}$ are generated by synthesizing belief information around the decision threshold s'.

(4) Output of BP Detector 144

After the completion of the T iterations, the belief generator 144 supplies the estimated value $r_m^{(T)}$ of each of the M separated transmitted signals to the decision and demodulator 145. The estimated value $r_m^{(T)}$ is given by the Equation (45):

$$r_m^{(T)} = \sum_{i=1}^{B} s_{i,m}^{(T)} / \sum_{i=1}^{B} \omega_{i,m}^{(T)} \quad (45)$$

FIG. 10 shows an example of the first parameter set, i.e., sets of scaling and the damping factors. These parameters may be stored in the memory 15-2 as an LUT 151. The table shown in FIG. 10 stores parameters for the total numbers of GaBP iterations T of three values (i.e., 3, 8, and 16). In this case, the processor 14-2 (e.g., the BP detector 144) of the base station 1 may use in the GaBP algorithm the subset of parameters corresponding to the configured (or selected) number of iterations T. The parameters for the number of iterations T include a scaling factor $a_T^{(t)}$ and a damping factor $\eta_T^{(t)}$ per iteration. The subscripts for these parameters indicate the total number of iterations. Specifically, when the total number of iterations T is 3, the parameters include: a set of a scaling factor $a_3^{(1)}$ and a damping factor $\eta_3^{(1)}$ for the first iteration; a set of a scaling factor $a_3^{(2)}$ and a damping factor $\eta_3^{(2)}$ for the second iteration; and a set of a scaling factor $a_3^{(3)}$ and a damping factor $\eta_3^{(3)}$ for the third iteration.

FIG. 11 shows an example of the second parameter set, i.e., combinations of a scaling factor and weight factors. Like in the table shown in FIG. 10, the table shown in FIG. 11 stores parameters for the cases that the total numbers of GaBP iterations T are 3, 8, and 16. The parameters for the number of iterations T include a scaling factor $a_T^{(t)}$ and a set $\{\eta_{T,t-k}^{(t)}\}$ of weight factors per iteration.

The examples shown in FIGS. 10 and 11 are merely examples. In another example, the BP detector 144 may operate only with one fixed value of the total number of iterations. In this case, the base station 1 may be supplied only with the parameters for this value of the total number of iterations. Alternatively, the base station 1 may be supplied with parameters for four or more values of the total number of iterations.

Figure 12:
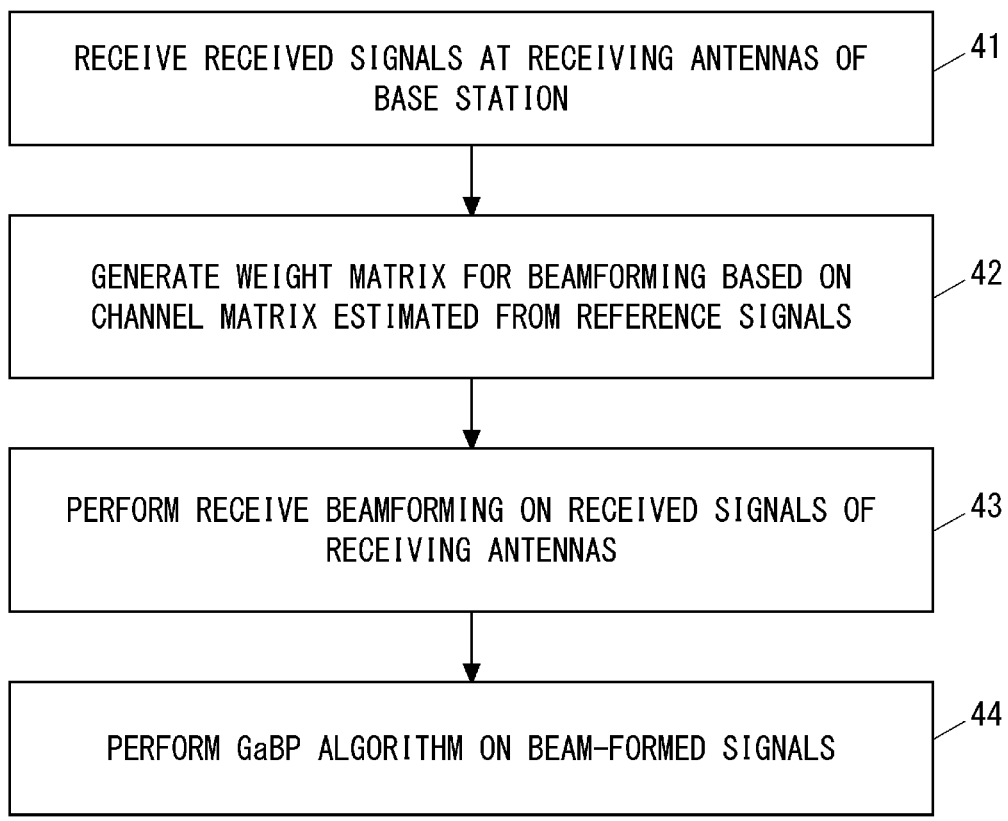
FIG. 12 is a flowchart showing an example of an operation of a base station according to the first example embodiment.

FIG. 12 shows an example of the operation of the base station 1. In step 41, the processor 14-2 (e.g., channel estimator 141) in the DU 11-2 receives reference signals received by antennas via the RF transceiver 13. In step 42, the processor 14-2 (e.g., beamforming weight generator 142) in the DU 11-2 decomposes the estimated N'×M' channel matrix H$^c$ into an N'×B' matrix W and a B'×M' matrix H$^{\prime c}$, and the matrix W is used as the beamforming weight. Here, the weight matrix W is a matrix whose columns, respectively corresponding to the elements of the beamformed received signal vector, are orthogonal to each other, while the matrix H$^{\prime c}$ must be a matrix containing two or more non-zero matrix elements in each of its columns.

In step 43, the processor 14-1 (e.g., beamformer 143-1) in the RU 11-1 receives data signals received by the antennas via the RF transceiver 13, performs receive beamforming on the received data signals using the generated beamforming weight W, and transmits the beamformed received signals via the fronthaul to the processor 14-2 (e.g., BP detector 144) in the DU 11-2. The processor 14-2 (e.g., beamformer 143-2) in the DU 11-2 may also perform receive beamforming. In this case, the processors 14-1 and 14-2 perform receive beamforming using beamforming weights W1 and W2, respectively.

In step 44, the processor 14-2 (e.g., BP detector 144) in the DU 11-2 performs a GaBP algorithm on the beamformed signals, producing estimated values $r_1$ to $r_M$ of the M separated transmitted signals. In one example, the processor 14-2 (e.g., BP detector 144) in the DU 11-2 may read scaling and damping factors (or scaling and weight factors) from memory 15-2. The processor 14-2 (e.g., BP detector 144) in the DU 11-2 may then perform the GaBP algorithm using the scaling and damping factors (or scaling and weight factors) to generate the estimates $r_1$ to $r_M$ of the M separated transmitted signals. The processor 14-2 (e.g., BP detector 144) in the DU 11-2 may perform the GaBP algorithm, while updating the scaling and damping factors (or scaling and weight factors) at each iteration. After that, the processor 14-2 (e.g., decision and demodulator 145) in the DU 11-2 decodes to the transmitted signals of all M' users based on the estimated values $r_1$ to $r_{M'}$.

This example embodiment can bring the following effects. First, in this example embodiment, the base station 1 performs receive beamforming using the weight matrix W described above. This can reduce the number of received signals transmitted in the fronthaul and thereby contributes to reducing the required fronthaul bandwidth. Second, since the equivalent channel matrix after receive beamforming is a square matrix containing two or more non-zero matrix elements in its each column, the variation in accuracy among the multiple beliefs generated by the BP algorithm is suppressed. This allows the beliefs to be updated for all the received signals simultaneously, resulting in a reduction in processing time.

In addition, the following effect is obtained when the GaBP algorithm is used in this example embodiment. Since the noise after receive-beamforming using the weight matrix W, whose columns are orthogonal to each other, is white, allowing the GaBP algorithm, which assumes white noise, to be used for the detection.

Second Example Embodiment

Figure 13:
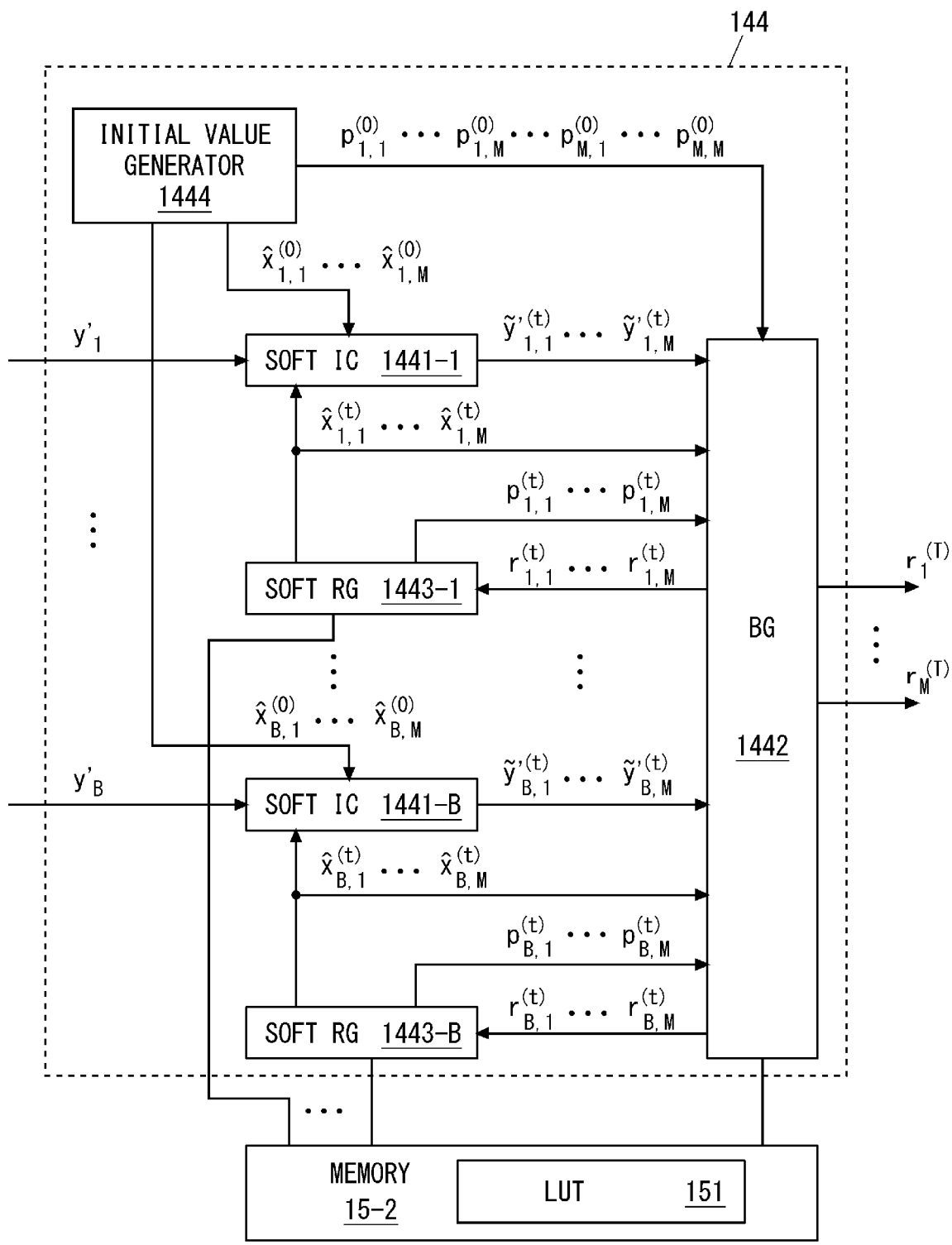
FIG. 13 is a diagram showing an example configuration of a BP detector including an initial value generator according to a second example embodiment.

In the second example embodiment, the BP detector 144 includes an initial value generator 1444 in addition to the elements described in the first example embodiment. FIG. 13 shows a configuration example of the BP detector 1444 in the second example embodiment. According to FIG. 13, the initial value generator 1444 is coupled to the soft interference cancellers 1441-1 to 1441-B and the belief generator 1442 to provide soft replica x hat$_{b,m}^{(0)}$ to each soft interference canceller and soft replica power $p_{b,m}^{(0)}$ to the belief generator. The soft replica x hat$_{b,m}^{(0)}$ and soft replica power p$_{b,m}^{(0)}$ are generated from the receive-beamformed received signal vector y' supplied by the beamformer 143-1 or 143-2. As shown in FIGS. 7 and 8, the processor 14-2 in the DU 11-2 may include the beamformer 143-2. In this case, the initial value generator 1444 may generate the soft replica x hat$_{b,m}^{(0)}$ and soft replica power p$_{b,m}^{(0)}$ by using the received signal vector y'$_{RU}$ supplied from the beamformer 143-1 in the processor 14-1 of the RU 11-1 shown in Equation (46):

$$y'_{RU} = W_1^H y \quad (46)$$

The soft replica x hat$_{b,m}^{(0)}$ and soft replica power p$_{b,m}^{(0)}$ are generated using a B'×M' initial value generation matrix W$_{init}$. The soft replica x hat$_{b,m}^{(0)}$ and soft replica power p$_{b,m}^{(0)}$ may be soft decision values for the product of the Hermitian conjugate of the initial value generation matrix W$_{init}$ and the receive-beamformed received signal vector (i.e., y' or y'$_{RU}$). Here, the soft replica x hat$_{b,m}^{(0)}$ and soft replica power p$_{b,m}^{(0)}$ are represented by equivalent real-valued models. In the first iteration, the soft interference cancellers 1441-1 to 1441-B for the first iteration perform interference cancellation using the soft replica x hat$_{b,m}^{(0)}$ supplied by the initial value generator 1444. Meanwhile, in the first iteration, the belief generator 1442 generates beliefs using the soft replica power supplied by the initial value generator 1444 and the post-cancellation received signal y' tilde$_{b,m}^{(1)}$ supplied by the soft interference cancellers 1441-1 to 1441-B.

The following describes the first through fourth implementation examples of the initial value generator 1444. In the first implementation example, the beamformer 143-1 or 143-2 provides the beamformed received signal vector y' to the initial value generator 1444. In the second through fourth implementation examples, the processor 14-2 in the DU 11-2 includes the beamformer 143-2, and the beamformer 143-1 provides the received signal vector y'$_{RU}$ to the initial value generator 1444. In the first through third implementation examples, B' is equal to M', while in the fourth implementation example, B' is any integer less than or equal to N'−1 and greater than or equal to M'.

In the first implementation example, the initial value generation matrix W$_{init}$ is the matrix shown in Equation (47):

$$W_{init}^H = (W^H W^c)^{-1} \quad (47)$$

where the matrix W is the weight matrix generated by the beamforming weight generator 142, and its columns are orthogonal. The matrix W may be, for example but not limited to, the product of a Q matrix generated by QR decomposition of the channel matrix and the DFT matrix, or the product of a matrix U generated by singular value decomposition of the channel matrix and a unitary matrix.

In the second implementation example, the initial value generation matrix W$_{init}$ is the matrix shown in Equation (48):

$$W_{init}^H = (W_1^H H^c)^{-1} \quad (48)$$

where the matrix W$_1$ is the sub-weight matrix used in the beamformer 143-1 in the processor 143-1 of the RU 11-1. Unlike the weight matrix W in the first implementation example, the sub-weight matrix W$_1$ is not limited to a matrix with orthogonal columns. The sub-weight matrix W$_1$ may be, for example, but not limited to, a channel matrix, a Q matrix generated by QR decomposition of the channel matrix, or a matrix U consisting of left singular vectors generated by singular value decomposition of the channel matrix. In this case, the sub-weight matrix W$_2$ used in the beamformer 143-2 in the processor 14-2 in the DU 11-2 is the −½ power of the Gram matrix of the sub-weight matrix W$_1$ shown in Equation (49):

$$W_2 = (W_1^H W_1)^{-1/2} \quad (49)$$

By using such a sub-weight matrix W$_2$, the product of W$_1$ and W$_2$ becomes an N'×M' matrix with orthogonal columns. If a matrix with orthogonal columns is used, such as a Q matrix or matrix U, the sub-weight matrix W$_2$ may be an M'-order unitary matrix. This makes the noise contained in the received signals supplied from the beamformer 143-2 to the BP detector 144 white.

In the second implementation example, if the matrix U consisting of left singular vectors generated by the singular value decomposition of the channel matrix is used as the sub-weight matrix W$_1$, the Hermitian conjugate of the initial value generation matrix W$_{init}$ is the product of the matrix V consisting of the right singular vectors and the inverse of the matrix Σ consisting of the singular values, as shown in Equation (50):

$$W_{init}^H = V\Sigma^{-1} \quad (50)$$

where since the matrix Σ is a diagonal matrix, the inverse of the matrix Σ is a diagonal matrix consisting of the inverse of each matrix element of the matrix Σ. Accordingly, the initial value generation matrix can be generated without the use of inverse matrix operations.

On the other hand, if the Q matrix generated by QR decomposition of the channel matrix is used as the sub-weight matrix W$_1$, the Hermitian conjugate of the initial value generation matrix W$_{init}$ is the inverse of the upper triangular matrix R, as shown in Equation (51):

$$W_{init}^H = R^{-1} \quad (51)$$

where the inverse of the upper triangular matrix R can be obtained by backward substitution with less arithmetic than the usual inverse matrix operation.

Alternatively, when the channel matrix is used as the sub-weight matrix W$_1$, the Hermitian conjugate of the initial value generation matrix W$_{init}$ and the sub-weight matrix W$_2$ are the inverse of the Gram matrix of the channel matrix and the −½ power of the Gram matrix of the channel matrix, respectively, as shown in Equations (52) and (53):

$$W_{init}^H = (H^{cH} H^c)^{-1} \quad (52)$$

$$W_2 = (H^{cH} H^c)^{-1/2} = ((H^{cH} H^c)^{-1})^{-1/2} \quad (53)$$

As shown in Equation 53, the −½ power of the Gram matrix of the channel matrix can be obtained by calculating the inverse of this Gram matrix and its square root. Put another way, the computation of the inverse of the Gram matrix of the channel matrix is needed to generate both the initial value generation matrix W$_{init}$ and the sub-weight matrix W$_2$. Accordingly, a single inverse operation can generate the inverse matrix that is used to generate the Hermitian conjugate of the initial value generation matrix W$_{init}$ and the sub-weight matrix W$_2$. Thus, the number of inverse matrix operations to obtain the initial value generation matrix W$_{init}$ can be reduced.

In the third implementation example, the sub-weight matrix W$_1$ is a Zero Forcing (ZF) weight and the initial value generation matrix W$_{init}$ is a unit matrix. The sub-weight matrix W$_1$ may be Minimum Mean Square Error (MMSE) weights. In this case, the beamformer 143-2 in the processor 14-2 in the DU 11-2 uses the matrix shown in Equation (49) as the sub-weight matrix W$_2$.

In the fourth implementation example, the initial value generation matrix W$_{init}$ is the matrix shown in Equation (54):

$$W_{init}{}^H = ((W_1{}^H H^c)^H (W_1{}^H H^c))^{-1} (W_1{}^H H^c)^H \quad (54)$$

In this case, the initial value generation matrix $W_{init}$ may be a B'×M' ZF weights. Alternatively, the MMSE weights may be used as the initial value generation matrix $W_{init}$.

The implementation of the initial value generator 1444 is not limited to the above-described implementation examples.

Figure 14:
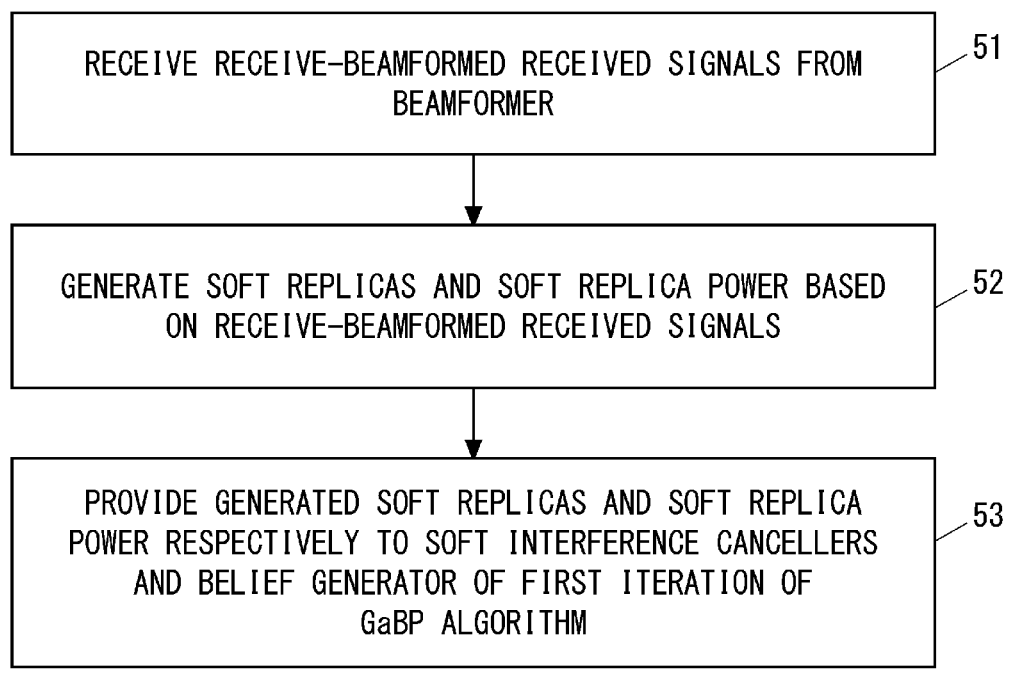
FIG. 14 is a flowchart showing an example of initial value generation according to the second example embodiment.

FIG. 14 shows an example of the operation of the initial value generator 1444. In step 51, the initial value generator 1444 receives receive-beamformed received signals from the beamformer 143-1 or 143-2. In step 52, the initial value generator 1444 generates soft replicas and soft replica power based on the receive-beamformed received signals. The soft replicas and soft replica power may be soft decision values of the product of the initial value generation matrix with the receive-beamformed received signals. In step 53, the initial value generator 1444 supplies the generated soft replicas and soft replica power respectively to the soft interference cancellers and belief generator of the first iteration of the GaBP algorithm, one of the BP algorithms.

This example embodiment can bring the following effects. First, in this example embodiment, the initial value generator 1444 generates the soft replica $x$ hat$_{b,m}^{(0)}$ and soft replica power $p_{b,m}^{(0)}$ using the receive-beamformed received signal, followed by belief generation in the first iteration. This contributes to reducing the required fronthaul bandwidth because only the receive-beamformed received signals are used by the DU, and thus only the receive-beamformed received signals need to be transmitted from the RU to the DU. Second, the initial value generator 1444 can generate more accurate beliefs for the first iteration of the GaBP algorithm. Thus, the base station 1 can achieve high detection accuracy with fewer iterations of the GaBP algorithm.

In addition, the following effect is obtained when the GaBP algorithm is used in this example embodiment. The noise in the received signals supplied to the soft interference cancellers 1441-1 to 1441-B from the beamformer 143-1 or 143-2 is white noise, which avoids performance degradation of the GaBP algorithm.

Third Example Embodiment

In the third example embodiment, the base station 1 has a parameter learner 17 in addition to the configuration described in the first or second example embodiment. The parameter learner 17 may be included in the processor 14-2. The parameter learner 17 learns parameters of the first parameter set (or second parameter set) together using deep unfolding and outputs the parameter set that has been learned together. The output parameter set may be stored in memory 15-2.

Figure 15:
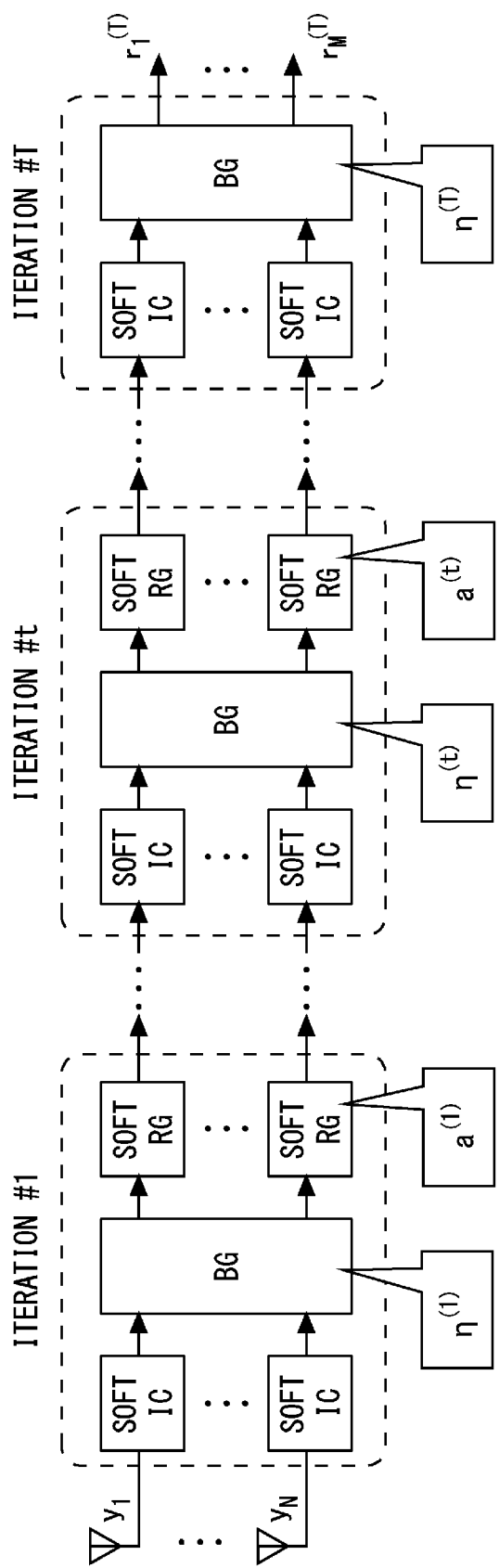
FIG. 15 is a conceptual diagram showing deep unfolding of a BP detector according to a third example embodiment.

FIG. 15 is a conceptual diagram showing deep unfolding for multi-user detection based on the GaBP algorithm, which is an example of a BP algorithm. The deep unfolding is a method of unfolding an iterative algorithm in its iterative direction and applying a deep learning scheme to the resulting process flow graph, which is considered a Deep Neural Network (DNN). The BP network shown in FIG. 5 is given by unfolding the GaBP algorithm performed by the BP detector 144 in the iterative direction. Each GaBP iteration corresponds to one layer of the DNN. Accordingly, it is possible to learn parameters embedded in the GaBP network. Specifically, the learnable (or trainable) parameters are the scaling factor $a^{(t)}$ and the damping factor $\eta^{(t)}$ in each iteration (or each layer), or the scaling factor $a^{(t)}$ and the set $\{\eta_{i,t-k}^{(t)}\}$ of weight factors in each iteration (or each layer). The learning is performed, for example, based on a gradient method and the parameters are adjusted together in the direction in which the cost becomes smaller.

Figure 16:
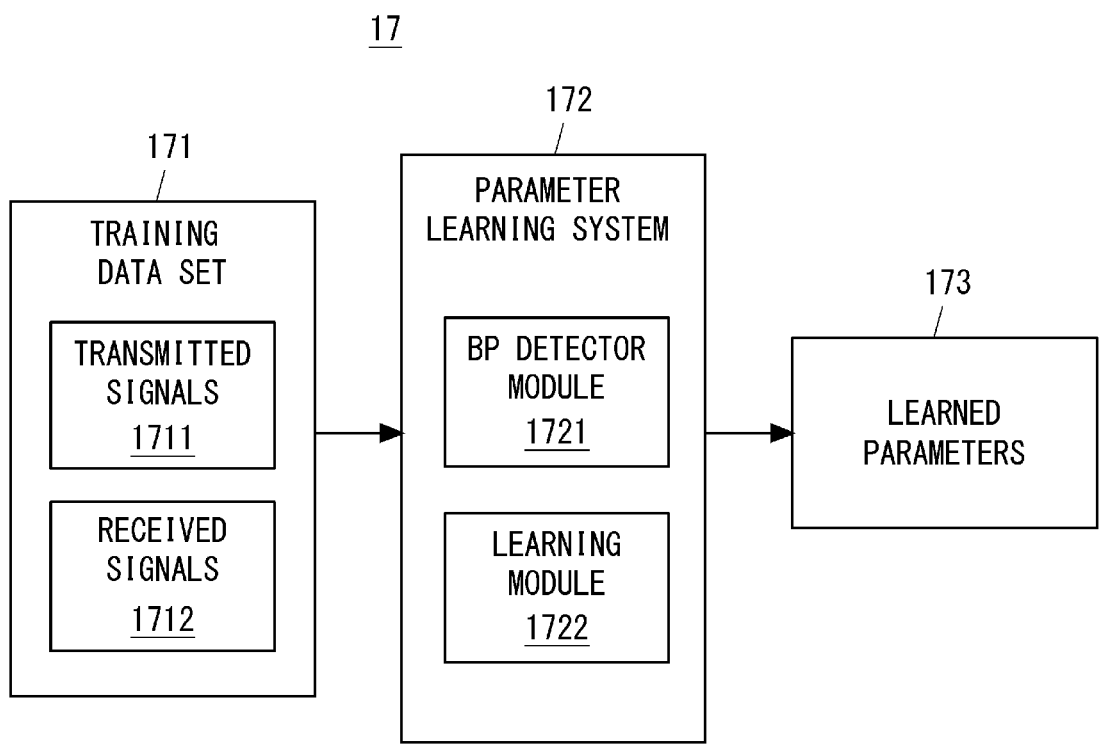
FIG. 16 is a diagram showing an example configuration of a parameter learner according to the third example embodiment.

FIG. 16 shows an example of the parameter learner 17. The training data set 171 includes a transmitted signal data set 1711 and a receive-beamformed received signal data set 1712. The transmitted signal data set 1711 may be randomly generated. The received signal data set, which is received by multiple receiving antennas, corresponds to the transmitted signal data set 1711 and is generated using the transmitted signal data set 1711 and a given channel matrix. The channel matrix may be randomly generated or may be generated based on a propagation path model defined in the 3rd Generation Partnership Project (3GPP) specifications or the like. Alternatively, the channel matrix may be generated based on measurement results in the actual environment where the base station 1 is installed. The receive-beamformed received signal data set 1712 is generated by performing receive beamforming on multiple received signals received at multiple receiving antennas, using the same implementation of the receive beamforming used at the base station 1. The specific receive beamforming implementation may be one of those described in the first example embodiment.

A parameter learning system 172 includes a BP detector module 1721 and a learning module 1722. The BP detector module 1721 emulates the processor 14-2 or BP detector 144 of the base station 1 described in the first or second example embodiment. The BP detector module 1721 is able to execute a BP algorithm that is the same as the BP algorithm implemented in the base station 1. The learning module 1722 trains the BP detector module 1721 using the training data set 171. The learning module 1722 may apply one or more deep learning algorithms.

In one example, the learning module 1722 may use an update algorithm, such as a gradient method. The gradient update method to be used may be, for example, an Adaptive moment estimation (Adam) optimizer algorithm. In addition, the learning module 1722 may use mini-batch learning. The number of learning iterations may be set to an appropriate value in view the risk of overfitting to the training data. To update the learning rate, a Step algorithm that gradually narrows the update width with respect to the number of learning iterations may be used. The cost function may be a Mean Square Error (MSE).

The learning module 1722 outputs a parameter set 173 that has been learned together with deep learning. The parameter set 173 learned together includes multiple scaling factors and multiple damping factors (or multiple scaling factors and multiple weight factors). The output parameter set 173 may be stored in the memory 15-2 as the LUT 151 as in FIGS. 8 and 9.

Figure 17:
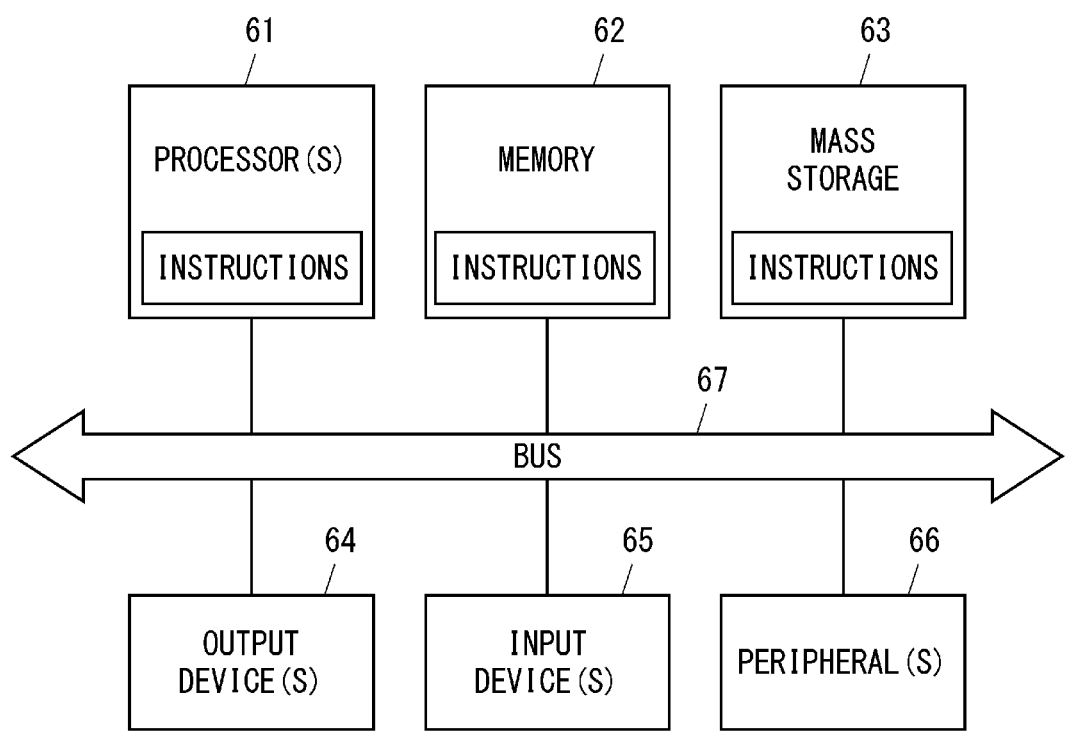
FIG. 17 is a diagram showing an example of a computer system according to the third example embodiment.

The parameter learner 17 may be a computer system as shown in FIG. 17. FIG. 17 shows a configuration example of a computer system. The computer system is able to execute one or more computer programs including a set of instructions, thereby performing, for example, a method for the parameter learner 17. The parameter learner 17 may be a standalone computer or may include one or more networked computers. The computer system may be one or both of a server and a client in a server-client environment. The computer system may be a personal computer, a tablet computer, or a smartphone.

In the example shown in FIG. 17, the computer system includes one or more processors 61, a memory 62, and a mass storage 63, which communicate with one another via a bus 67. The one or more processors 61 may include, for example, one or both of a Central Processing Unit(s) (CPU (s)) and a Graphics Processing Unit(s) (GPU(s)). The computer system may include other devices, such as one or more output devices 64, one or more input devices 65, and one or more peripherals 66. The one or more output devices 64 include, for example, a video display and a speaker. The one or more input devices 65 include, for example, a keyboard, mouse, keypad, touchpad, or touchscreen, or any combination thereof. The one or more peripheral devices 66 include a printer, modem, or network adapter, or any including any combination thereof.

One or both the memory 62 and the mass storage 63 contain a computer-readable medium storing one or more sets of instructions. These instructions may be stored partially or completely in a memory in the processor 61. These instructions, when executed in the processor 61, cause the processor 61 to perform, for example, the process shown in FIG. 18.

Figure 18:
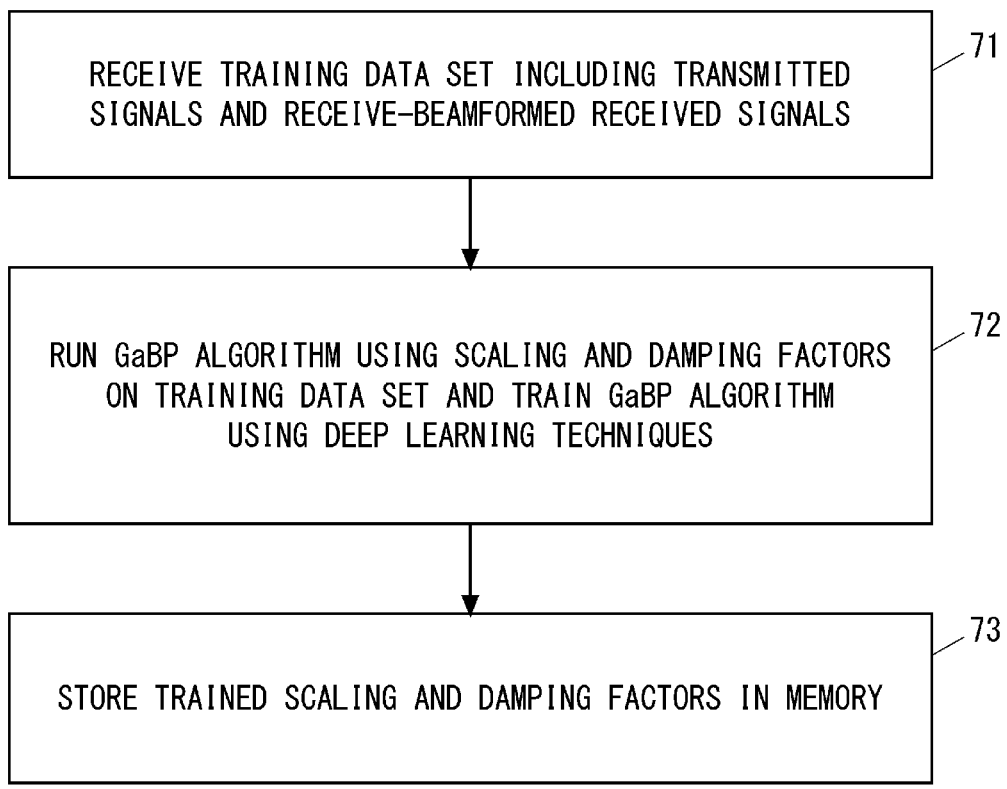
FIG. 18 is a flowchart showing an example of parameter learning according to the third example embodiment.

FIG. 18 shows an example of the operation of the parameter learner 17. In this example, a GaBP algorithm is used as the BP algorithm. In step 71, the parameter learning system 172 receives the training data set 171. Here, the training data set 171 includes the transmitted signals 1711 and the received signals 1712 after receive-beamforming with the beamforming weights implemented at the base station 1. In step 72, the parameter learning system 172 runs a GaBP algorithm using scaling and damping factors on the training data set 171 and trains the GaBP algorithm using deep learning techniques. The trainable parameters are the scaling factors and damping factors. In step 73, the parameter learning system 172 stores the trained scaling and damping factors 173 in a memory (e.g., memory 15-2).

Alternatively, in step 72, the parameter learning system 172 may perform a GaBP algorithm using scaling and weight factors on the training data set 171. The trainable parameters are the scaling and weight factors. In this case, at step 73, the parameter learning system 172 stores the trained scaling and weight factors 173 in a memory (e.g., memory 15-2).

Figure 19:
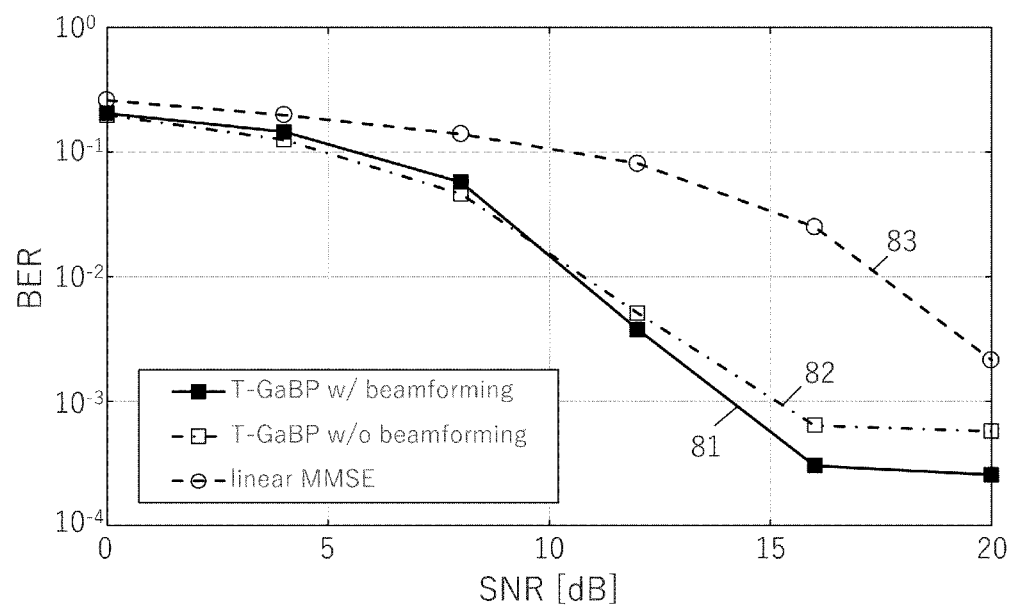
FIG. 19 is a diagram showing a bit error rate performance of a receiver according to the third example embodiment.

FIG. 19 shows a comparison in Bit Error Rate (BER) performance between the GaBP detector after receive beamforming according to this example embodiment and existing linear Minimum Mean Square Error (MMSE) and GaBP detectors without receive beamforming. Receive beamforming is not performed in the existing methods. These are simulation results for a multiuser MIMO configuration with (N', M')=(64, 16), where M' is the number of terminals and N' is the number of receiving antenna elements. The total number of iterations (T) of the GaBP detectors in this example embodiment and the existing method is 32, and Low-Density Parity-Check (LDPC) codes with a coding ratio of about 0.6 are used as error correction codes. The graph 81 shows the BER of the GaBP detector that uses a learned parameter set of scaling and weight factors on signals after receive beamforming using the product of the Q matrix and the unitary matrix described as the first implementation example in the first example embodiment. Here, the DFT matrix is used as the unitary matrix. On the other hand, the graph 82 is a comparative example and shows the BER of the GaBP detector using a learned parameter set of scaling and weight factors without receive beamforming. The graph 83 is another comparative example and shows the BER of the MMSE detector without receive beamforming. These results confirm that the GaBP detector of this example embodiment can reduce the required fronthaul bandwidth without performance degradation from the GaBP detector of the existing method. In addition, the GaBP detector of this example embodiment shows an improvement of about 5 dB or more at BER=$10^{-3}$ compared to the MMSE detector of the existing method.

In this example embodiment, deep unfolding is used to learn the first or second parameter set using the receive-beamformed received signals, which contributes to multi-user detection by the BP detector 144 using quasi-optimal parameter values taking into account the characteristics of the receive beamforming and BP detector 144. This improves the detection characteristics of the BP detector 144.

Other Example Embodiments

As described above, in some implementations, the processors 14-1 and 14-2 included in the base station 1 execute one or more programs including instructions for causing a computer to execute any one or more of the algorithms described in the above example embodiments. In addition, the parameter learner 17 executes one or more programs including instructions for causing a computer to execute deep learning. Each of these programs contains a set of instructions (or software codes) that, when loaded into a computer, causes the computer to perform one or more of the functions described in the example embodiments. Each of these programs may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. Each program may be transmitted on a transitory computer readable medium or a communication medium. By way of example, and not limitation, transitory computer readable media or communication media can include electrical, optical, acoustical, or other form of propagated signals.

The parameter set (e.g., at least one of the scaling factors, damping factors, and weight factors) used in the GaBP algorithm in the first and second example embodiments need not be derived from deep learning. In some implementations, the scaling factor per iteration may be the same value for all iterations. Additionally or alternatively, the damping factor per iteration may be the same value for all iterations. Additionally or alternatively, the set of weighting factors per iteration may follow a periodic pattern of selection of a subset of receiving antennas. In this case, the possible values of the weight factors may be 0 or 1.

An example advantage according to the above-described example embodiments is to contribute to reducing the processing time required for multi-user detection at a DU while reducing the required bandwidth of the fronthaul between the DU and the RU.

The above-described example embodiment is merely examples of the application of the technical ideas obtained by the inventors. These technical ideas are not limited to the above-described example embodiment and various modifications can be made thereto.

The whole or part of the example embodiments disclosed above can be described as, but not limited to, the following supplementary notes.

Supplementary Note 1

A wireless receiving apparatus comprising:
at least one beamforming weight generator configured to:

generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M'; or generate a combination of an N'×B' sub-weight matrix $W_1$ and at least one second sub-weight matrix, wherein a product of the sub-weight matrix $W_1$ with the at least one second sub-weight matrix is equal to the weight matrix W;

a first beamformer configured to perform receive beamforming on received signals of the N' receiving antennas using the weight matrix W or the sub-weight matrix $W_1$; and a belief propagation (BP) detector configured to perform a BP algorithm using signals output from the first beamformer and transmitted through a fronthaul.

Supplementary Note 2

The wireless receiving apparatus according to Supplementary Note 1, comprising a Radio Unit (RU) and a Distributed Unit (DU) connected to each other via the fronthaul, wherein the first beamformer is included in the RU, the BP detector is included in the DU, and the at least one beamforming weight generator is included in at least one of the RU and the DU.

Supplementary Note 3

The wireless receiving apparatus according to Supplementary Note 1 or 2, wherein the receive beamforming includes taking a product of a Hermitian conjugate of the weight matrix W or of the sub-weight matrix $W_1$ with a received signal vector composed of the received signals of the N' receiving antennas.

Supplementary Note 4

The wireless receiving apparatus according to any one of Supplementary Notes 1 to 3, further comprising a second beamformer, wherein the at least one beamforming weight generator is configured to generate a combination of the sub-weight matrix $W_1$ and a B'×B' sub-weight matrix $W_2$, the product of which is equal to the weight matrix W, and to provide the sub-weight matrix $W_1$ to the first beamformer and the sub-weight matrix $W_2$ to the second beamformer, the first beamformer is configured to perform receive beamforming by taking a product of a Hermitian conjugate of the sub-weight matrix $W_1$ with a received signal vector composed of the received signals of the N' receiving antennas, the second beamformer is configured to perform receive beamforming by taking a product of a Hermitian conjugate of the sub-weight matrix $W_2$ with signals output from the first beamformer and transmitted via the fronthaul, and to provide beamformed signals to the BP detector, and the BP detector is configured to perform the BP algorithm on the signals supplied from the second beamformer.

Supplementary Note 5

The wireless receiving apparatus according to any one of Supplementary Notes 1 to 4, wherein the at least one beamforming weight generator is configured to:

divide the N'×M' channel matrix into K $N'_k$×M' sub-matrices;

decompose each sub-matrix into an $N'_k$×$B'_k$ matrix $W_k$ whose columns are orthogonal to each other and a $B'_k$×M' matrix containing two or more non-zero matrix elements in each column, wherein the smaller of $N'_k$ and M' is $B'_k$; and output, as the weight matrix W, a block diagonal matrix having the matrix $W_k$ as a diagonal component.

Supplementary Note 6

The wireless receiving apparatus according to any one of Supplementary Notes 1 to 4, wherein the at least one beamforming weight generator is configured to:

output, as the weight matrix W, a product of an N'×M' Q-matrix obtained by QR-decomposing the N'×M' channel matrix with an M'-order unitary matrix; or output the Q-matrix as the sub-weight matrix $W_1$ and the M'-order unitary matrix as the sub-weight matrix $W_2$.

Supplementary Note 7

The wireless receiving apparatus according to any one of Supplementary Notes 1 to 4, wherein the at least one beamforming weight generator is configured to:

output, as the weight matrix W, an N'×M' matrix composed of left singular vectors obtained by singular value decomposition of the N'×M' channel matrix; or output, as the weight matrix W, a product of the N'×M' matrix and an M'-order unitary matrix; or output the N'×M' matrix as the sub-weight matrix $W_1$ and the M'-order unitary matrix as the sub-weight matrix $W_2$.

Supplementary Note 8

The wireless receiving apparatus according to any one of Supplementary Notes 1 to 4, wherein the at least one beamforming weight generator is configured to:

output, as the weight matrix W, a product of the N'×M' channel matrix and a −½ power of a Gram matrix of the N'×M' channel matrix; or output the channel matrix as the sub-weight matrix $W_1$ and the −½ power of the Gram matrix as the sub-weight matrix $W_2$; or output the channel matrix as the sub-weight matrix $W_1$ and a product of the −½ power of the Gram matrix with an M'-order unitary matrix as the sub-weight matrix $W_2$; or output a product of the channel matrix with the −½ power of the Gram matrix as the sub-weight matrix $W_1$ and an M'-order unitary matrix as the sub-weight matrix $W_2$.

Supplementary Note 9

The wireless receiving apparatus according to any one of Supplementary Notes 1 to 8, further comprising at least one memory configured to store a first parameter set including a plurality of scaling factors and a plurality of damping factors or a second parameter set including a plurality of scaling factors and a plurality of weight factors, wherein the BP detector is configured to perform a Gaussian Belief Propagation (GaBP) algorithm using the first parameter set or the second parameter set, and the BP detector comprises:

a soft interference canceller configured to, using replicas of all transmitted signals except an m'-th transmitted signal generated in a (t−1)th iteration, subtract components of the all transmitted signals except a component of the m'-th transmitted signal from an m-th received signal of the plurality of received signals, and thereby generate a post-cancellation m-th received signal;

a belief generator configured to generate a belief associated with the m-th received signal based at least on the damping factor or weight factor and the post-cancellation m-th received signal; and a soft replica generator configured to generate a replica of the m'-th transmitted signal in a t-th iteration based at least on the scaling factor and the belief.

Supplementary Note 10

The wireless receiving apparatus according to Supplementary Note 9, wherein at least one of the first parameter set and the second parameter set includes parameters learned together using a deep learning technique based on receive-beamformed received signals and transmitted signals.

Supplementary Note 11

The wireless receiving apparatus according to any one of Supplementary Notes 1 to 10, wherein the BP detector includes an initial value generator, wherein the initial value generator is configured to:

generate, as a soft replica and soft replica power, a soft decision value for a product of a Hermitian conjugate of a B'×M' initial value generation matrix and the receive-beamformed received signals provided from the first beamformer; and provide the soft replica and soft replica power to the first iteration of the BP algorithm performed by the BP detector.

Supplementary Note 12

The wireless receiving apparatus according to Supplementary Note 11, wherein the initial value generation matrix is a product of (a) an inverse matrix of a product of a Hermitian conjugate of an equivalent channel matrix $H'^c$ after the receive beamforming with the matrix $H'^c$ and (b) the Hermitian conjugate of the matrix $H'^c$.

Supplementary Note 13

The wireless receiving apparatus according to Supplementary Note 11, referring directly or indirectly to Supplementary Note 4, wherein the sub-weight matrix $W_1$ is an N'×M' matrix composed of left singular vectors obtained by singular value decomposition of the N'×M' channel matrix, the sub-weight matrix $W_2$ is an arbitrary M'-order unitary matrix, and the initial value generating matrix is a product of an M'-order diagonal matrix whose diagonal components are inverse values of singular values obtained by the singular value decomposition, with a Hermitian conjugate of an M'-order square matrix composed of right singular vectors.

Supplementary Note 14

The wireless receiving apparatus according to Supplementary Note 11, referring directly or indirectly to Supplementary Note 4, wherein the sub-weight matrix $W_1$ is the N'×M' channel matrix, the sub-weight matrix $W_2$ is a $-\frac{1}{2}$ power of a product of a Hermitian conjugate of the channel matrix with the channel matrix, and the initial value generating matrix is an inverse matrix of the product of the Hermitian conjugate of the channel matrix with the channel matrix.

Supplementary Note 15

A method performed by a wireless receiving apparatus, the method comprising:

generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;

performing first receive beamforming on received signals of the N' receiving antennas using the weight matrix W or the sub-weight matrix $W_1$; and performing a belief propagation (BP) algorithm using signals which the first receive beamforming has been performed for and transmitted via a fronthaul.

Supplementary Note 16

The method according to Supplementary Note 15, wherein the performing the first receive beamforming includes performing the first receive beamforming in a Radio Unit (RU); and the performing the BP algorithm includes performing the BP algorithm in a Distributed Unit (DU) coupled to the RU via the fronthaul.

Supplementary Note 17

The method according to Supplementary Note 15 or 16, wherein the first receive beamforming includes taking a product of a Hermitian conjugate of the weight matrix W or of the sub-weight matrix $W_1$ with a received signal vector composed of the received signals of the N' receiving antennas.

Supplementary Note 18

The method according to any one of Supplementary Notes 15 to 17, further comprising performing a second receive beamforming, wherein the generating includes generating a combination of the sub-weight matrix $W_1$ and a B'×B' sub-weight matrix $W_2$, the product of which is equal to the weight matrix W, the performing the first receive beamforming includes taking a product of a Hermitian conjugate of the sub-weight matrix $W_1$ with a received signal vector composed of the received signals of the N' receiving antennas, the performing the second receive beamforming includes taking a product of a Hermitian conjugate of the sub-weight matrix $W_2$ with a signal vector generated by the first receive beamforming, and the performing the BP algorithm includes performing the BP algorithm on signals obtained by the second receive beamforming.

Supplementary Note 19

The method according to any one of Supplementary Notes 15 to 18, wherein the generating includes:
dividing the N'×M' channel matrix into K N'$_k$×M' sub-matrices;
decomposing each sub-matrix into an N'$_k$×B'$_k$ matrix W$_k$ whose columns are orthogonal to each other and a B'$_k$×M' matrix containing two or more non-zero matrix elements in each column, wherein the smaller of N'$_k$ and M' is B'$_k$; and
outputting, as the weight matrix W, a block diagonal matrix having the matrix W$_k$ as a diagonal component.

Supplementary Note 20

The method according to any one of Supplementary Notes 15 to 18, wherein the generating includes:
outputting, as the weight matrix W, a product of an N'×M' Q-matrix obtained by QR-decomposing the N'×M' channel matrix with an M'-order unitary matrix; or
outputting the Q-matrix as the sub-weight matrix W$_1$ and the M'-order unitary matrix as the sub-weight matrix W$_2$.

Supplementary Note 21

The method according to any one of Supplementary Notes 15 to 18, wherein the generating includes:
outputting, as the weight matrix W, an N'×M' matrix composed of left singular vectors obtained by singular value decomposition of the N'×M' channel matrix; or
outputting, as the weight matrix W, a product of the N'×M' matrix and an M'-order unitary matrix; or
outputting the N'×M' matrix as the sub-weight matrix W$_1$ and the M'-order unitary matrix as the sub-weight matrix W$_2$.

Supplementary Note 22

The method according to any one of Supplementary Notes 15 to 18, wherein the generating includes:
outputting, as the weight matrix W, a product of the N'×M' channel matrix and a $-\frac{1}{2}$ power of a Gram matrix of the N'×M' channel matrix; or
outputting the channel matrix as the sub-weight matrix W$_1$ and the $-\frac{1}{2}$ power of the Gram matrix as the sub-weight matrix W$_2$; or
outputting the channel matrix as the sub-weight matrix W$_1$ and a product of the $-\frac{1}{2}$ power of the Gram matrix with an M'-order unitary matrix as the sub-weight matrix W$_2$; or
outputting a product of the channel matrix with the $-\frac{1}{2}$ power of the Gram matrix as the sub-weight matrix W$_1$ and an M'-order unitary matrix as the sub-weight matrix W$_2$.

Supplementary Note 23

The method according to any one of Supplementary Notes 15 to 22, wherein the performing the BP algorithm includes:
reading from a memory a first parameter set including a plurality of scaling factors and a plurality of damping factors or a second parameter set including a plurality of scaling factors and a plurality of weight factors; and
performing a Gaussian Belief Propagation (GaBP) algorithm using the first parameter set or the second parameter set.

Supplementary Note 24

The method according to Supplementary Note 23, wherein at least one of the first parameter set and the second parameter set includes parameters learned together using a deep learning technique based on receive-beamformed received signals and transmitted signals.

Supplementary Note 25

The method according to any one of Supplementary Notes 15 to 24, further comprising:
generating, as a soft replica and soft replica power, a soft decision value for a product of a Hermitian conjugate of a B'×M' initial value generation matrix and the receive-beamformed received signals provided; and
providing the soft replica and soft replica power to the first iteration of the BP algorithm.

Supplementary Note 26

The method according to Supplementary Note 25, wherein the initial value generation matrix is a product of (a) an inverse matrix of a product of a Hermitian conjugate of an equivalent channel matrix H'$^c$ after the receive beamforming with the matrix H'$^c$ and (b) the Hermitian conjugate of the matrix H'$^c$.

Supplementary Note 27

The method according to Supplementary Note 25, referring directly or indirectly to Supplementary Note 18, wherein
the sub-weight matrix W$_1$ is an N'×M' matrix composed of left singular vectors obtained by singular value decomposition of the N'×M' channel matrix,
the sub-weight matrix W$_2$ is an arbitrary M'-order unitary matrix, and
the initial value generating matrix is a product of an M'-order diagonal matrix whose diagonal components are inverse values of singular values obtained by the singular value decomposition, with a Hermitian conjugate of an M'-order square matrix composed of right singular vectors.

Supplementary Note 28

The method according to Supplementary Note 25, referring directly or indirectly to Supplementary Note 18, wherein
the sub-weight matrix W$_1$ is the N'×M' channel matrix,
the sub-weight matrix W$_2$ is a $-\frac{1}{2}$ power of a product of a Hermitian conjugate of the channel matrix with the channel matrix, and
the initial value generating matrix is an inverse matrix of the product of the Hermitian conjugate of the channel matrix with the channel matrix.

Supplementary Note 29

A program for causing a computer to perform a method for a wireless receiving apparatus, wherein the method comprises:

generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;

performing first receive beamforming on received signals of the N' receiving antennas using the weight matrix W or the sub-weight matrix $W_1$; and performing a belief propagation (BP) algorithm using signals which the first receive beamforming has been performed for and transmitted via a fronthaul.

Supplementary Note 30

A Radio Unit (RU) included in a wireless receiving apparatus and configured to be coupled via a fronthaul to a Distributed Unit (DU) of the wireless receiving apparatus, the RU comprising:

at least one beamforming weight generator configured to:
generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×N' weight matrix W and a B'×M' matrix containing two or more non-zero matrix elements in each column, wherein B' is an integer less than or equal to N'−1 and greater than or equal to M'; or generate a combination of an N'×B' sub-weight matrix $W_1$ and at least one second sub-weight matrix, wherein a product of the sub-weight matrix $W_1$ with the at least one second sub-weight matrix is equal to the weight matrix W; and a first beamformer configured to perform receive beamforming on received signals of the N' receiving antennas using the weight matrix W or the sub-weight matrix $W_1$ and provide beamformed signals to the DU via the fronthaul.

Supplementary Note 31

The RU according to Supplementary Note 30, wherein the beamformed signals is used by the DU to perform a Belief Propagation (BP) algorithm using the beamformed signals.

Supplementary Note 32

The RU according to Supplementary Note 30 or 31, wherein the receive beamforming includes taking a product of a Hermitian conjugate of the weight matrix W or of the sub-weight matrix $W_1$ with a received signal vector composed of the received signals of the N' receiving antennas.

Supplementary Note 33

A method performed by a Radio Unit (RU) included in a wireless receiving apparatus and coupled via a fronthaul to a Distributed Unit (DU) of the wireless receiving apparatus, the method comprising:

generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;

performing receive beamforming on received signals of the N' receiving antennas using the weight matrix W or the sub-weight matrix $W_1$; and providing beamformed signals to the DU via the fronthaul.

Supplementary Note 34

A program for causing a computer to perform a method for a Radio Unit (RU) included in a wireless receiving apparatus and coupled via a fronthaul to a Distributed Unit (DU) of the wireless receiving apparatus, the method comprising: generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;

performing receive beamforming on received signals of the N' receiving antennas using the weight matrix W or the sub-weight matrix $W_1$; and providing beamformed signals to the DU via the fronthaul.

Supplementary Note 35

A Distributed Unit (DU) included in a wireless receiving apparatus and configured to be coupled via a fronthaul to a Radio Unit (RU) of the wireless receiving apparatus, the DU comprising:

at least one beamforming weight generator configured to:
generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M'; or generate a combination of an N'×B' sub-weight matrix $W_1$ and at least one second sub-weight matrix, wherein a product of the sub-weight matrix $W_1$ with the at least one second sub-weight matrix is equal to the weight matrix W; and a belief propagation (BP) detector configured to perform a BP algorithm using signals, the signals being generated and transmitted via the fronthaul by the RU by performing receive beamforming on received signals of the N' receiving antennas using the weight matrix W or the sub-weight matrix $W_1$.

Supplementary Note 36

A method performed by a Distributed Unit (DU) included in a wireless receiving apparatus and coupled via a fronthaul to a Radio Unit (RU) of the wireless receiving apparatus, the method comprising:
generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;
providing the weight matrix W or the sub-weight matrix $W_1$ to the RU; and
performing a BP algorithm using signals, the signals being generated and transmitted via the fronthaul by the RU by performing receive beamforming on received signals of the N' receiving antennas using the weight matrix W or the sub-weight matrix $W_1$.

Supplementary Note 37

A program for causing a computer to perform a method for a Distributed Unit (DU) included in a wireless receiving apparatus and coupled via a fronthaul to a Radio Unit (RU) of the wireless receiving apparatus, the method comprising:
generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;
providing the weight matrix W or the sub-weight matrix $W_1$ to the RU; and
performing a BP algorithm using signals, the signals being generated and transmitted via the fronthaul by the RU by performing receive beamforming on received signals of the N' receiving antennas using the weight matrix W or the sub-weight matrix $W_1$.

The invention claimed is:
1. A wireless receiving apparatus comprising:
at least one beamforming weight generator configured to:
generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M'; or
generate a combination of an N'×B' sub-weight matrix $W_1$ and at least one second sub-weight matrix, wherein a product of the sub-weight matrix $W_1$ with the at least one second sub-weight matrix is equal to the weight matrix W;
a first beamformer configured to perform receive beamforming on received signals of the N' receiving antennas using the weight matrix W or the sub-weight matrix $W_1$; and
a belief propagation (BP) detector configured to perform a BP algorithm using signals output from the first beamformer and transmitted through a fronthaul.

2. The wireless receiving apparatus according to claim 1, comprising a Radio Unit (RU) and a Distributed Unit (DU) connected to each other via the fronthaul, wherein
the first beamformer is included in the RU,
the BP detector is included in the DU, and
the at least one beamforming weight generator is included in at least one of the RU and the DU.

3. The wireless receiving apparatus according to claim 1, wherein the receive beamforming includes taking a product of a Hermitian conjugate of the weight matrix W or of the sub-weight matrix $W_1$ with a received signal vector composed of the received signals of the N' receiving antennas.

4. The wireless receiving apparatus according to claim 1, further comprising a second beamformer, wherein
the at least one beamforming weight generator is configured to generate a combination of the sub-weight matrix $W_1$ and a B'×B' sub-weight matrix $W_2$, the product of which is equal to the weight matrix W, and to provide the sub-weight matrix $W_1$ to the first beamformer and the sub-weight matrix $W_2$ to the second beamformer,
the first beamformer is configured to perform receive beamforming by taking a product of a Hermitian conjugate of the sub-weight matrix $W_1$ with a received signal vector composed of the received signals of the N' receiving antennas,
the second beamformer is configured to perform receive beamforming by taking a product of a Hermitian conjugate of the sub-weight matrix $W_2$ with signals output from the first beamformer and transmitted via the fronthaul, and to provide beamformed signals to the BP detector, and
the BP detector is configured to perform the BP algorithm on the signals supplied from the second beamformer.

5. The wireless receiving apparatus according to claim 4, wherein the BP detector includes an initial value generator, wherein
the initial value generator is configured to:
generate, as a soft replica and soft replica power, a soft decision value for a product of a Hermitian conjugate of a B'×M' initial value generation matrix and the receive-beamformed received signals provided from the first beamformer; and
provide the soft replica and soft replica power to the first iteration of the BP algorithm performed by the BP detector,
the sub-weight matrix $W_1$ is an N'×M' matrix composed of left singular vectors obtained by singular value decomposition of the N'×M' channel matrix, the sub-weight matrix $W_2$ is an arbitrary M'-order unitary matrix, and the initial value generating matrix is a product of an M'-order diagonal matrix whose diagonal components are inverse values of singular values obtained by the singular value decomposition, with a Hermitian conjugate of an M'-order square matrix composed of right singular vectors.

6. The wireless receiving apparatus according to claim 4, wherein the BP detector includes an initial value generator, wherein the initial value generator is configured to:
generate, as a soft replica and soft replica power, a soft decision value for a product of a Hermitian conjugate of a B'×M' initial value generation matrix and the receive-beamformed received signals provided from the first beamformer; and provide the soft replica and soft replica power to the first iteration of the BP algorithm performed by the BP detector, the sub-weight matrix $W_1$ is the N'×M' channel matrix, the sub-weight matrix $W_2$ is a $-\frac{1}{2}$ power of a product of a Hermitian conjugate of the channel matrix with the channel matrix, and the initial value generating matrix is an inverse matrix of the product of the Hermitian conjugate of the channel matrix with the channel matrix.

7. The wireless receiving apparatus according to claim 1, wherein the at least one beamforming weight generator is configured to:

divide the N'×M' channel matrix into K $N'_k \times M'$ sub-matrices;

decompose each sub-matrix into an $N'_k \times B'_k$ matrix $W_k$ whose columns are orthogonal to each other and a $B'_k \times M'$ matrix containing two or more non-zero matrix elements in each column, wherein the smaller of $N'_k$ and M' is $B'_k$; and output, as the weight matrix W, a block diagonal matrix having the matrix $W_k$ as a diagonal component.

8. The wireless receiving apparatus according to claim 1, wherein the at least one beamforming weight generator is configured to:

output, as the weight matrix W, a product of an N'×M' Q-matrix obtained by QR-decomposing the N'×M' channel matrix with an M'-order unitary matrix; or output the Q-matrix as the sub-weight matrix $W_1$ and the M'-order unitary matrix as the sub-weight matrix $W_2$.

9. The wireless receiving apparatus according to claim 1, wherein the at least one beamforming weight generator is configured to:

output, as the weight matrix W, an N'×M' matrix composed of left singular vectors obtained by singular value decomposition of the N'×M' channel matrix; or output, as the weight matrix W, a product of the N'×M' matrix and an M'-order unitary matrix; or output the N'×M' matrix as the sub-weight matrix $W_1$ and the M'-order unitary matrix as the sub-weight matrix $W_2$.

10. The wireless receiving apparatus according to claim 1, wherein the at least one beamforming weight generator is configured to:

output, as the weight matrix W, a product of the N'×M' channel matrix and a $-\frac{1}{2}$ power of a Gram matrix of the N'×M' channel matrix; or output the channel matrix as the sub-weight matrix $W_1$ and the $-\frac{1}{2}$ power of the Gram matrix as the sub-weight matrix $W_2$; or output the channel matrix as the sub-weight matrix $W_1$ and a product of the $-\frac{1}{2}$ power of the Gram matrix with an M'-order unitary matrix as the sub-weight matrix $W_2$; or output a product of the channel matrix with the $-\frac{1}{2}$ power of the Gram matrix as the sub-weight matrix $W_1$ and an M'-order unitary matrix as the sub-weight matrix $W_2$.

11. The wireless receiving apparatus according to claim 1, further comprising at least one memory configured to store a first parameter set including a plurality of scaling factors and a plurality of damping factors or a second parameter set including a plurality of scaling factors and a plurality of weight factors, wherein the BP detector is configured to perform a Gaussian Belief Propagation (GaBP) algorithm using the first parameter set or the second parameter set, and the BP detector comprises:
a soft interference canceller configured to, using replicas of all transmitted signals except an m'-th transmitted signal generated in a (t−1)th iteration, subtract components of the all transmitted signals except a component of the m'-th transmitted signal from an m-th received signal of the plurality of received signals, and thereby generate a post-cancellation m-th received signal;

a belief generator configured to generate a belief associated with the m-th received signal based at least on the damping factor or weight factor and the post-cancellation m-th received signal; and a soft replica generator configured to generate a replica of the m'-th transmitted signal in a t-th iteration based at least on the scaling factor and the belief.

12. The wireless receiving apparatus according to claim 11, wherein at least one of the first parameter set and the second parameter set includes parameters learned together using a deep learning technique based on receive-beamformed received signals and transmitted signals.

13. The wireless receiving apparatus according to claim 1, wherein the BP detector includes an initial value generator, wherein the initial value generator is configured to:

generate, as a soft replica and soft replica power, a soft decision value for a product of a Hermitian conjugate of a B'×M' initial value generation matrix and the receive-beamformed received signals provided from the first beamformer; and provide the soft replica and soft replica power to the first iteration of the BP algorithm performed by the BP detector.

14. The wireless receiving apparatus according to claim 13, wherein the initial value generation matrix is a product of (a) an inverse matrix of a product of a Hermitian conjugate of an equivalent channel matrix $H'^e$ after the receive beamforming with the matrix $H'^e$ and (b) the Hermitian conjugate of the matrix $H'^e$.

15. A method performed by a wireless receiving apparatus, the method comprising:

generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;
performing first receive beamforming on received signals of the N' receiving antennas using the weight matrix W or the sub-weight matrix $W_1$; and
performing a belief propagation (BP) algorithm using signals which the first receive beamforming has been performed for and transmitted via a fronthaul.

16. A non-transitory computer readable medium storing a program for causing a computer to perform a method for a wireless receiving apparatus, wherein the method comprises:
generating an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M', or generating a combination of an N'×B' sub-weight matrix $W_1$ and at least one second sub-weight matrix, wherein a product of the sub-weight matrix $W_1$ with the at least one second sub-weight matrix is equal to the weight matrix W;
performing first receive beamforming on received signals of the N' receiving antennas using the weight matrix W or the sub-weight matrix $W_1$; and
performing a belief propagation (BP) algorithm using signals which the first receive beamforming has been performed for and transmitted via a fronthaul.

17. A Radio Unit (RU) included in a wireless receiving apparatus and configured to be coupled via a fronthaul to a Distributed Unit (DU) of the wireless receiving apparatus, the RU comprising:
at least one beamforming weight generator configured to:
generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M'; or
generate a combination of an N'×B' sub-weight matrix $W_1$ and at least one second sub-weight matrix, wherein a product of the sub-weight matrix $W_1$ with the at least one second sub-weight matrix is equal to the weight matrix W; and
a first beamformer configured to perform receive beamforming on received signals of the N' receiving antennas using the weight matrix W or the sub-weight matrix $W_1$ and provide beamformed signals to the DU via the fronthaul.

18. A Distributed Unit (DU) included in a wireless receiving apparatus and configured to be coupled via a fronthaul to a Radio Unit (RU) of the wireless receiving apparatus, the DU comprising:
at least one beamforming weight generator configured to:
generate an N'×B' weight matrix W whose columns are orthogonal to each other by decomposing an estimated N'×M' channel matrix, defined between M' transmitting antennas of one or more wireless transmitting apparatuses and N' receiving antennas coupled to the wireless receiving apparatus, into the N'×B' weight matrix W and a B'×M' matrix containing two or more non-zero matrix elements in each column, wherein B' is an integer less than or equal to N'−1 and greater than or equal to M'; or
generate a combination of an N'×B' sub-weight matrix $W_1$ and at least one second sub-weight matrix, wherein a product of the sub-weight matrix $W_1$ with the at least one second sub-weight matrix is equal to the weight matrix W; and
a belief propagation (BP) detector configured to perform a BP algorithm using signals, the signals being generated and transmitted via the fronthaul by the RU by performing receive beamforming on received signals of the N' receiving antennas using the weight matrix W or the sub-weight matrix $W_1$.

* * * * *